US006628292B1

(12) United States Patent
Ashburn et al.

(10) Patent No.: US 6,628,292 B1
(45) Date of Patent: Sep. 30, 2003

(54) CREATING PAGE COHERENCY AND IMPROVED BANK SEQUENCING IN A MEMORY ACCESS COMMAND STREAM

(75) Inventors: Jon L Ashburn, Fort Collins, CO (US); Bryan G. Prouty, Wellington, CO (US)

(73) Assignee: Hewlett-Packard Development Company, LP., Houston, TX (US)

(*) Notice: Subject to any disclaimer, the term of this patent is extended or adjusted under 35 U.S.C. 154(b) by 0 days.

(21) Appl. No.: 09/364,973

(22) Filed: Jul. 31, 1999

(51) Int. Cl.[7] .............................................. G06F 12/02

(52) U.S. Cl. ....................... 345/565; 345/570; 345/571; 345/531; 345/533; 710/310; 710/39; 710/52

(58) Field of Search ................................ 345/503, 506, 345/520, 522, 531, 533, 535, 537, 545, 565, 570, 571; 710/33, 35, 39, 54, 52, 55, 56, 310

(56) References Cited

U.S. PATENT DOCUMENTS

| | | | | | |
|---|---|---|---|---|---|
| 5,561,780 | A | * | 10/1996 | Glew et al. | 710/52 |
| 5,767,856 | A | * | 6/1998 | Peterson et al. | 345/422 |
| 5,822,772 | A | * | 10/1998 | Chan et al. | 710/52 |
| 5,870,625 | A | * | 2/1999 | Chan et al. | 710/5 |
| 5,892,978 | A | * | 4/1999 | Munguia et al. | 710/33 |
| 5,948,081 | A | * | 9/1999 | Foster | 710/25 |
| 6,002,412 | A | * | 12/1999 | Schinnerer | 345/558 |
| 6,047,334 | A | * | 4/2000 | Langendorf et al. | 709/103 |
| 6,075,544 | A | * | 6/2000 | Malachowsky et al. | 345/545 |
| 6,088,772 | A | * | 7/2000 | Harriman et al. | 711/158 |
| 6,101,568 | A | * | 8/2000 | Richardson | 710/310 |
| 6,112,265 | A | * | 8/2000 | Harriman et al. | 710/40 |
| 6,223,258 | B1 | * | 4/2001 | Palanca et al. | 711/133 |
| 6,260,123 | B1 | * | 7/2001 | Strongin et al. | 711/158 |
| 6,279,087 | B1 | * | 8/2001 | Melo et al. | 710/310 |
| 6,313,845 | B1 | * | 11/2001 | Terry et al. | 345/537 |
| 6,317,124 | B2 | * | 11/2001 | Reynolds | 345/422 |
| 6,324,612 | B1 | * | 11/2001 | Chen et al. | 710/306 |
| 6,356,270 | B2 | * | 3/2002 | Pentkovski et al. | 345/530 |
| 6,356,485 | B1 | * | 3/2002 | Proebsting | 365/189.01 |

* cited by examiner

*Primary Examiner*—Ulka J. Chauhan
(74) *Attorney, Agent, or Firm*—Kevin M. Hart

(57) ABSTRACT

A buffer facilitates reordering of incoming memory access commands so that the memory access commands may be associated automatically according to their row/bank addresses. The storage capacity in the buffer may be dynamically allocated among groups as needed. When the buffer is flushed, groups of memory access commands are selected for flushing whose row/bank addresses are associated, thereby creating page coherency in the flushed memory access commands. Batches of commands may be flushed from the buffer according to a sequence designed to minimize same-bank page changes in frame buffer memory devices. Good candidate groups for flushing may be chosen according to criteria based on the binary bank address for the group, the size of the group, and the age of the group. Groups may be partially flushed. If so, a subsequent flush operation may resume flushing a partially-flushed group when to do so would be more beneficial than flushing a different group chosen solely based on its bank address. The first and last commands flushed in any batch are accompanied by flags indicating that they are the first and last commands in the batch, respectively.

21 Claims, 17 Drawing Sheets

CREATING PAGE COHERENCY AND IMPROVED BANK SEQUENCING IN A MEMORY ACCESS COMMAND STREAM

RELATED APPLICATIONS

This application is related to U.S. patent application Ser. No. 09/364,971, filed Jul. 31, 1999, titled "Creating Column Coherency for Burst Building in a Memory Access Command Stream," and to U.S. patent application Ser. No. 09/364,972, filed Jul. 31, 1999, titled "Z Test and Conditional Merger of Colliding Pixels During Batch Building."

FIELD OF THE INVENTION

This invention relates generally to computer memory systems. More particularly, the invention relates to methods and apparatus for enhancing memory access performance. The invention has particularly beneficial application with regard to frame buffer memories in computer graphics systems.

BACKGROUND

Frame buffer memories and the bandwidth problem. A frame buffer memory is typically used in a computer graphics system to store all of the color information necessary to control the appearance of each pixel on a display device. Color information is usually stored in terms of RGBA components (a red intensity component, a green intensity component, a blue intensity component, and an "alpha" transparency value). In addition, the frame buffer memory is often used to store non-color information that is accessed during the rendering and modification of images. For example, "Z" or "depth" values may be stored in the frame buffer memory to represent the distance of pixels from the viewpoint, and stencil values may be stored in the frame buffer memory to restrict drawing to certain areas of the screen. In operation, upstream graphics hardware issues a stream of read and write commands with accompanying addresses directed to the frame buffer memory. In turn, a frame buffer memory controller receives the command stream and responds to each command by operating the memory devices that make up the frame buffer memory itself. Depending on the rendering modes enabled at any given time, a single frame buffer memory access command issued by upstream hardware may result in numerous accesses to the frame buffer memory by the frame buffer memory controller. For further background regarding frame buffer memories and their uses, see James D. Foley et al., *Computer Graphics: Principles and Practice* chapter 18 (2d ed., Addison-Wesley 1990) and Mason Woo et al., *OpenGL Programming Guide* chapter 10 (2d ed., Addison-Wesley 1997).

Over time, the resolution capabilities of display devices have increased, and consequently so has the amount of information (both color and non-color) that must be stored in the frame buffer memory. In addition, refresh cycles of display devices have become shorter. The result has been that access rates for modern frame buffer memories have become extremely high. Due to cost, the vast majority of frame buffer memories are constructed using dynamic random access memories ("DRAMs") instead of static random access memories ("SRAMs") or specially-ported video random access memories ("VRAMs"). Unfortunately, DRAMs present certain performance problems related to, for example, the need to activate and deactivate pages, and the need to refresh storage locations regularly. Although DRAM memory device clock frequencies have increased over time, their latency characteristics have not improved so dramatically. Thus, numerous techniques have been proposed to increase DRAM frame buffer memory bandwidth.

Memory devices: banks, bursts, SDR and DDR. One technique that has been employed to increase DRAM frame buffer memory bandwidth has been to divide the memory devices internally into independently-operating banks, each bank having its own set of row (page) and column addresses. The use of independent banks improves memory bandwidth because, to the extent bank accesses can be interleaved with proper memory mapping, a row in one bank can be activated or precharged while a row in a different bank is being accessed. When this is possible, the wait time required for row activation and precharge may be concealed so that it does not negatively impact memory bandwidth.

Another technique has been to employ memory devices that support burst cycles. In a burst memory cycle, multiple words of data (each corresponding to a different but sequential address) are transferred into or out of the memory even though only a single address was specified at the beginning of the burst. The memory device itself increments or decrements the addresses appropriately during the burst based on the initially specified address. Burst operation increases memory bandwidth because it creates "free" command cycles during the burst that otherwise would have been occupied by the specification of sequential addresses. The free command cycles so created may be used, for example, to precharge and activate rows in other banks in preparation for future memory accesses.

In a single-data-rate ("SDR") memory device, data may be transferred only once per clock cycle. A double-data-rate ("DDR") memory device, on the other hand, is capable of transferring data on both phases of the clock. Both SDR and DDR devices are capable of burst-mode memory accesses. For SDR devices, the minimum burst length that can create a free command cycle is two consecutive words (column addresses). The absolute minimum burst length for SDR devices is one word (column address). An example of an SDR device is the NEC uPD4564323 synchronous DRAM, which is capable of storing 64 Mbits organized as 524,288 words×32 bits×4 banks. For double-data-rate devices, the minimum burst length that can create a free command cycle is four consecutive words (column addresses). The absolute minimum burst length for DDR devices is two consecutive words (column addresses). An example of a DDR device is the SAMSUNG KM416H430T hyper synchronous DRAM, which is capable of storing 64 Mbits organized as 1,048,576 words×16 bits×4 banks.

The problem of column coherency in a graphics command stream. In order to capitalize on the burst-mode capabilities of frame buffer memory devices, prior art graphics systems depended on the natural occurrence of sequential column addresses in the various streams of read and write commands issued by upstream hardware. For example, with coherent triangle rendering and appropriate mapping of x,y screen space to RAM address space, many pairs of sequential column addresses could be made to occur naturally in the stream of pixel commands requested by a rasterizer. Indeed, such a solution worked adequately in times when DDR memory devices were not available.

Now, however, DDR memory devices are often used to construct the frame buffer memory. For prior art systems to capitalize on the burst-mode capabilities of a DDR device, a substantial number of quadruplets of sequential column addresses would have to occur naturally in the command stream; but the natural production of a substantial number of quadruplets of sequential column addresses is difficult if not impossible to achieve with mere memory mapping. This is especially true now that graphics applications are capable of drawing smaller triangles (having fewer pixels per triangle) than did the applications of the past.

The problem of page coherency in a graphics command stream. Changing from one row to another row in the same bank of a memory device (also known as a same-bank page change) requires wait time for closing the previous page and activating the new page. Prior art graphics systems employed two techniques in attempting to avoid this performance penalty. First, the mapping of x,y screen space to RAM address space was constructed so as to make same-bank page changes occur as infrequently as possible. Second, memory access commands were sorted into FIFO buffers according to bank: Specifically, two FIFOs per memory device bank were employed so that access commands directed to the same bank of a memory device could be further sorted according to page. Of course, if only two FEFOs per bank are employed in this manner, then grouping is only possible for up to two different pages within a single bank. If a memory access command appeared in the command stream directed to a third page within the bank, then one of the FIFOs would have to be flushed. Adding more FIFOs per bank in such a system might provide added efficiency because it would allow page-wise grouping for more than two of the bank's pages at one time. On the other hand, such a solution would be expensive because of the number of FIFOs required to implement it, particularly in the case of the newer 4-bank memory devices. Moreover, the solution would be wasteful because the FIFOs so provided would rarely all be full at the same time.

A need therefore exists for a technique for sorting memory accesses commands from a graphics command stream by row and bank without a proliferation of FIFOs.

Batching and the problem of pixel collisions. Changing from read mode to write mode presents another kind of memory performance penalty because it requires memory dead cycles. In part for this reason, prior art graphics systems have attempted to group as many read operations together as possible before transitioning to write operations, rather than, to freely interleave writes with reads when it is not necessary to do so. Such a grouping of memory access commands together is known as "batching." As alluded to above, in certain rendering modes one frame buffer memory access command issued by upstream hardware may result in numerous frame buffer accesses by the frame buffer controller. For example, in image read-modify-write mode with z test enabled, one frame buffer memory write command may result in four frame buffer accesses: a z buffer read, a z buffer write, an image buffer read, and an image buffer write. Thus, prior art systems have also attempted to batch as many z reads together as possible, as many z writes together as possible, as many image reads together as possible, and as many image writes together as possible.

Such prior art batching systems yielded memory bandwidth efficiencies to the extent that they decreased the frequency of read-to-write transitions and changes from one buffer to another. However, they suffered from at least the following limitation: accesses to the same pixel location had to be placed in separate batches; otherwise the result would be a "pixel collision." This meant that, depending on the vagaries of the command stream, a developing batch might have to be cut short simply because a second access to the same pixel location occurred within a relative few commands from the first access to that pixel location. The result was a decreased average batch size. This problem is even greater in modern graphics systems because modern applications utilize greater depth complexity. Thus, pixel collisions occur more frequently than in the past.

SUMMARY OF THE INVENTION

In one aspect, a specially-designed buffer facilitates reordering of incoming memory access commands so that the memory access commands may be associated automatically according to their row/bank addresses. When the buffer is flushed, groups of commands are selected for flushing whose row/bank addresses are associated, thereby creating page coherency in the flushed pixel commands that was not present in the incoming command stream. The page coherency so created has the effect of increasing batch size.

Implemented in a computer graphics system, the buffer may include a bus for receiving pixel commands from a pipeline, the pixel commands accompanied by pixel data, a pixel row/bank address and a pixel column address; a row/bank address storage array for storing the pixel row/bank address in a first row/bank address entry; a column address storage array for storing at least some of the MSBs of the pixel column address in a first line; a line-in-use bit for associating the first row/bank address entry with the first line of the column address storage array; and a multi-line pixel data storage array having a first line of pixel entry locations associated with the first line of the column address storage array. Importantly, the storage capacity in the buffer may be dynamically allocated among groups as needed on-the-fly. Thus, numerous small row/bank groups may be stored at one time, or a few large row/bank groups, or any combination in between. Thus, efficient use is made of the storage capacity of the buffer.

In another aspect, batches of pixel commands may be flushed from the buffer according to a special sequence designed to minimize same-bank page changes in the frame buffer memory devices. Specifically, a group may be selected for flushing if its binary bank address is not equal to the binary bank address of the last-flushed group AND is not equal to the bit inverse of the binary bank address of the last-flushed group. Such a selection is especially beneficial for frame buffer memory mappings in which the z information for a given pixel is located in a bank whose binary address is equal to the bit inverse of the binary address of the bank containing the image information for that pixel.

In another aspect, good candidate groups for flushing from the buffer may be chosen according to special criteria based on the binary bank address for the group, the size of the group, and the age of the group. In addition, groups may be partially flushed. If so, a subsequent flush operation may resume flushing a partially-flushed group when to do so would be more beneficial than flushing a different group chosen solely based on its bank address.

In yet another aspect, the first and last pixel commands flushed in any batch are accompanied by flags indicating that they are the first and last pixel commands in the batch, respectively. The flags are used by downstream hardware to facilitate the process of activating and deactivating pages in frame buffer memory devices.

DETAILED DESCRIPTION OF THE PREFERRED EMBODIMENTS

1 A Representative Host Computer System

Figure 1:
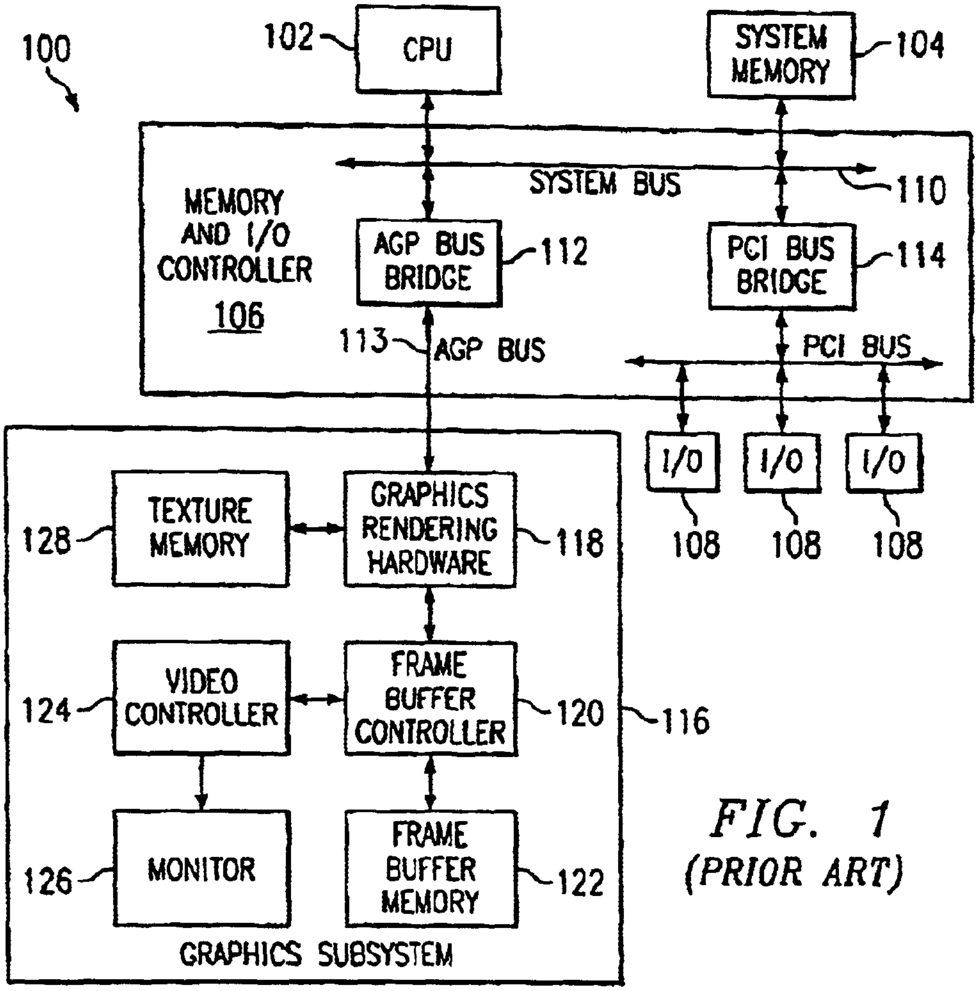
FIG. 1 (PRIOR ART)
FIG. 1 is a block diagram illustrating a representative computer system suitable for hosting an embodiment of the invention.

FIG. 1 illustrates a computer system 100 suitable for implementing a preferred embodiment of the invention. Computer system 100 includes at least one CPU 102, system memory 104, memory and I/O controller 106, and several I/O devices 108 such as a printer, scanner, network interface or the like. (A keyboard and mouse would also usually be present as I/O devices, but may have their own types of interfaces to computer system 100.) Typically, memory and I/O controller 106 will include a system bus 110 and at least one bus interface such as AGP bus bridge 112 and PCI bus bridge 114. PCI bus bridge 114 may be used to interface I/O devices 108 to system bus 110, while AGP bus bridge 112 may be used, for example, to interface graphics subsystem 116 to system bus 110.

Graphics subsystem 116 will typically include graphics rendering hardware 118, frame buffer controller 120 and frame buffer memory 122. Frame buffer controller 120 is interfaced with a video controller 124 (e.g., RAMDACs and sync and blank generation circuitry) for driving display monitor 126. Graphics rendering hardware 118 will typically include 2D and perhaps 3D geometry acceleration hardware interfaced with AGP bus 113, as well as rasterizer/texture mapping hardware interfaced with texture memory 128 and frame buffer controller 120.

The specific types of buses shown in the drawing, as well as the architecture of computer system 100 and graphics subsystem 116, are provided by way of example only. Other bus types and computer and graphics subsystem architectures may be used in connection with the invention. For example, the data width of frame buffer memory 122 may differ depending on the embodiment: Some frame buffer memories are designed with 32-bit-wide storage locations, others with 16-bit-wide storage locations, and still others with 8-bit-wide storage locations. In addition, graphics system operations involving the frame buffer may be carried out in various modes. For example, in some graphics systems, each frame buffer memory access command allows 32 bits to be used to specify RGBA information for pixels. If a 16-bit-wide frame buffer memory is used in such a system, then "single-pixel" mode would mean using 32 bits in each command to specify RGBA information for one pixel; the RGBA information would be compressed to 16 bits downstream prior to storing it in the frame buffer. "Multi-pixel" mode in such a system would mean using the 32 bits of the memory access command to specify RGBA information for two pixels at once (16 bits per pixel). Multi-pixel mode might be used, for example, during block movement operations commonly referred to as "blits." The invention described herein may be used successfully with minor modifications in all such graphics system embodiments. To simplify the following discussion, however, the preferred embodiments will be described in terms of a graphics system that uses a 32-bit frame buffer and uses 32 bits in each memory access command to specify RGBA information for one pixel at a time (single-pixel mode); but several modifications that would be helpful when using the invention in other types of graphics system embodiments will be indicated at the end of this discussion.

2 Structure of the Preferred Embodiments

Figure 2:
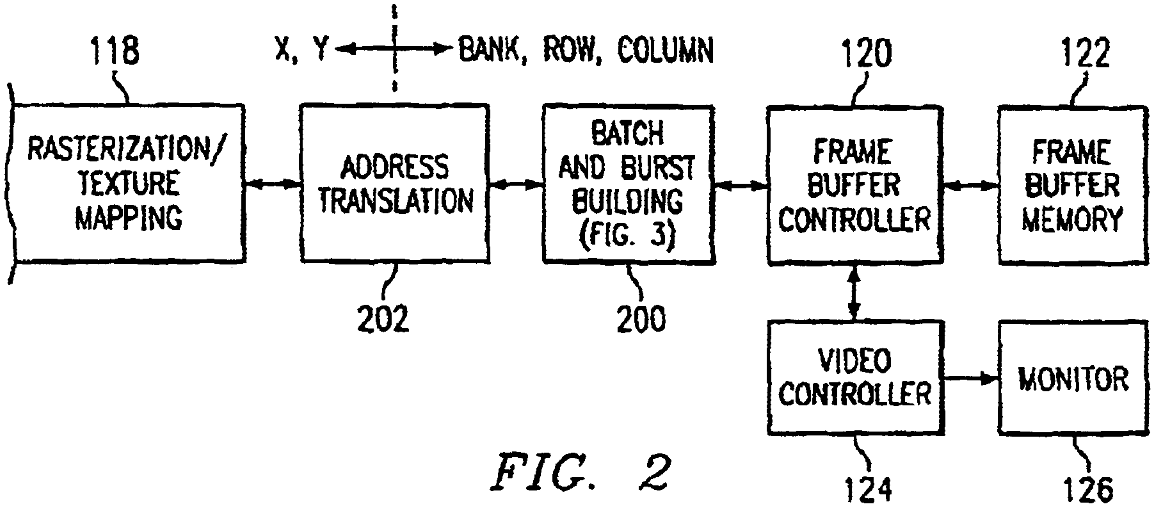
FIG. 2 is a block diagram illustrating part of a graphics pipeline into which an embodiment of the invention has been inserted.

The invention would preferably be implemented within a batch and burst building circuitry 200, as shown in FIG. 2. Batch and burst building circuitry 200 may be interposed in the command stream between frame buffer controller 120 and the rasterization/texture mapping portion of graphics rendering hardware 118. Address translation function 202 may be part of graphics rendering hardware 118; it is shown separately from hardware 118 in the drawing simply to represent the process of translating addresses specified in the x,y screen space into addresses specified in terms of the banks, rows and columns of the actual memory devices used to construct frame buffer memory 122. If frame buffer memory 122 is implemented in slices, then typically a distributor would be interposed in the command stream after translation function 202. The distributor would route commands to the appropriate slices based on their target addresses. In such an implementation, batch and burst building circuitry 200 and frame buffer controller 120 would be duplicated per slice and operated as parallel streams.

Figure 3:
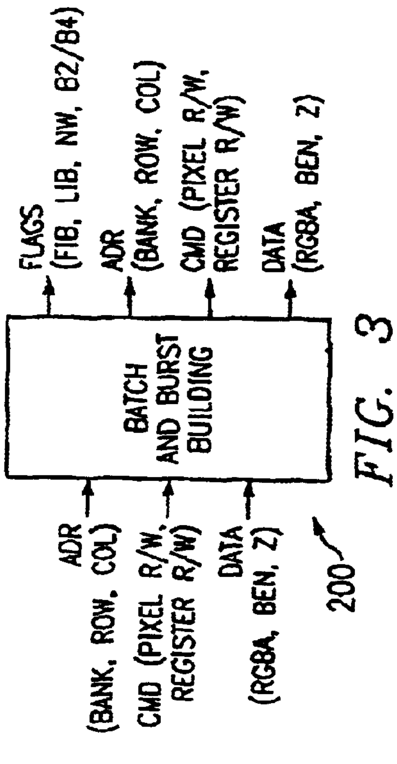
FIG. 3 is a block diagram illustrating a preferred set of inputs and outputs for the batch and burst building circuitry of FIG. 2.

FIG. 3 illustrates batch and burst building circuitry 200 in more detail so that its preferred inputs and outputs may be seen. From address translation function 202, batch and burst building circuitry 200 receives memory and register access commands stated in terms of-three components- command ("CMD"), address ("ADR"), and DATA. Among the commands that are pertinent to this discussion would be, for example, pixel read or write commands (inclusive of image and z buffer commands), and register read or write commands. The target address of a pixel read or write command would be stated in terms of the bank, row and column address of the pixel to be accessed. Depending on the type of pixel command, the data to be read from or written to a pixel location may include RGBA component values, four bits of byte enable information ("BEN"), each of the four BEN bits corresponding to one of the RGBA components, and a z value. The command stream exiting from the output side of batch and burst building circuitry 200 includes the same CMD, ADR and DATA components as the command stream entering the input side, but the exiting command stream may have been altered by batch and burst building circuitry 200 in terms of command order and content.

In addition to the CMD, ADR and DATA components of the command stream, batch and burst building circuitry 200 adds a set of flags to each command, as shown. The acronym "FIB" stands for "first burst in batch." The FIB flag signifies to frame buffer controller 120 that the associated pixel command corresponds to the first pixel, in the first burst, of a new batch. Thus, when frame buffer controller 120 sees the FIB flag asserted in association with a pixel command, it should activate the page corresponding to that pixel command when it is possible to do so. The acronym "LIB" stands for "last burst in batch." The LIB flag signifies to frame buffer controller 120 that the associated pixel command corresponds to one of the pixels in the last burst of a batch. Thus, when frame buffer controller 120 sees the LIB flag asserted in association with a burst of pixels, it should close the page corresponding to that burst at the earliest opportunity. The acronym "NW" stands for "no write." The NW flag signifies to frame buffer controller 120 that the associated pixel command is simply a dummy that is included in the command stream to fill out a two or four-cycle burst, but should not actually be written into frame buffer memory 122. The acronym "B2/B4" stands for "burst 2 or burst 4." The B2/B4 flag signifies to frame buffer controller 120 whether the associated pixel command should be included in a two-cycle burst or a 4-cycle burst.

Given the meanings of each of the flags shown in FIG. 3 and the operation of batch and burst building circuitry 200 as described in detail herein, persons having ordinary skill in the art will be able to construct a frame buffer memory controller 120 that effectively utilizes the just-described flags to facilitate batch and burst operations vis-a-vis frame buffer memory 122. For additional background, however, on preferred aspects of the design and construction of such a frame buffer memory controller 120, the following co-pending U.S. patent applications are hereby incorporated by reference as if entirely set forth herein: Ser. No. 09/042,384, filed Mar. 13, 1998, titled "A FIFO Architecture with Built-In Intelligence to Support Paging Requirements for Graphics Memory Systems"; Ser. No. 09/042,291, filed Mar. 13, 1998, titled "A Batching Architecture for Reduction or Elimination of Paging Overhead in 3D Graphics Memory Systems with Detached Z Buffering"; and Ser. No. 09/076,380, filed May 12, 1998, titled "Reduced Latency Priority Interrupts and Look-Ahead Paging."

Figure 4:
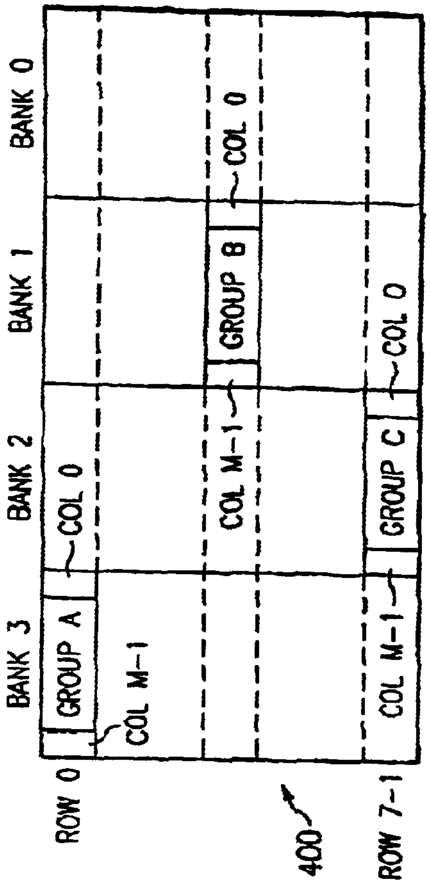
FIG. 4 is a block diagram illustrating the logical organization of a 4-bank DRAM memory device.

FIG. 4 is included to explain certain terminology that will be used throughout the remainder of this discussion. Representative memory device 400 is organized into four banks, numbered 0–3. Each bank includes n rows and m columns. Each unique bank/row/column address specifies a memory location (which location may have any width, depending on the type and combination of memory devices used to construct the frame buffer memory—typically 16 or 32 bits). All memory locations sharing the same unique row/bank address constitute a page or "group." Example groups A, B and C are shown in the drawing. Within each group, column addresses go from 0 to m−1. When reference is made herein to column address least significant bits, or column address "LSBs," the least significant two bits of the column address of a memory location are meant. Note that the two LSBs of the column addresses from 0 to m−1 display a repeating pattern of 00, 01, 10, 11 across the group. For purposes of this discussion, any four pixels in the same group whose column addresses are consecutive will be referred to as a pixel quad. Thus, for any pixel quad in any group, the column address LSBs will be 00, 01, 10, 11. When reference is made herein to column address most significant bits, or column address "MSBs," all but the two LSBs of the column address are meant.

Figure 5:
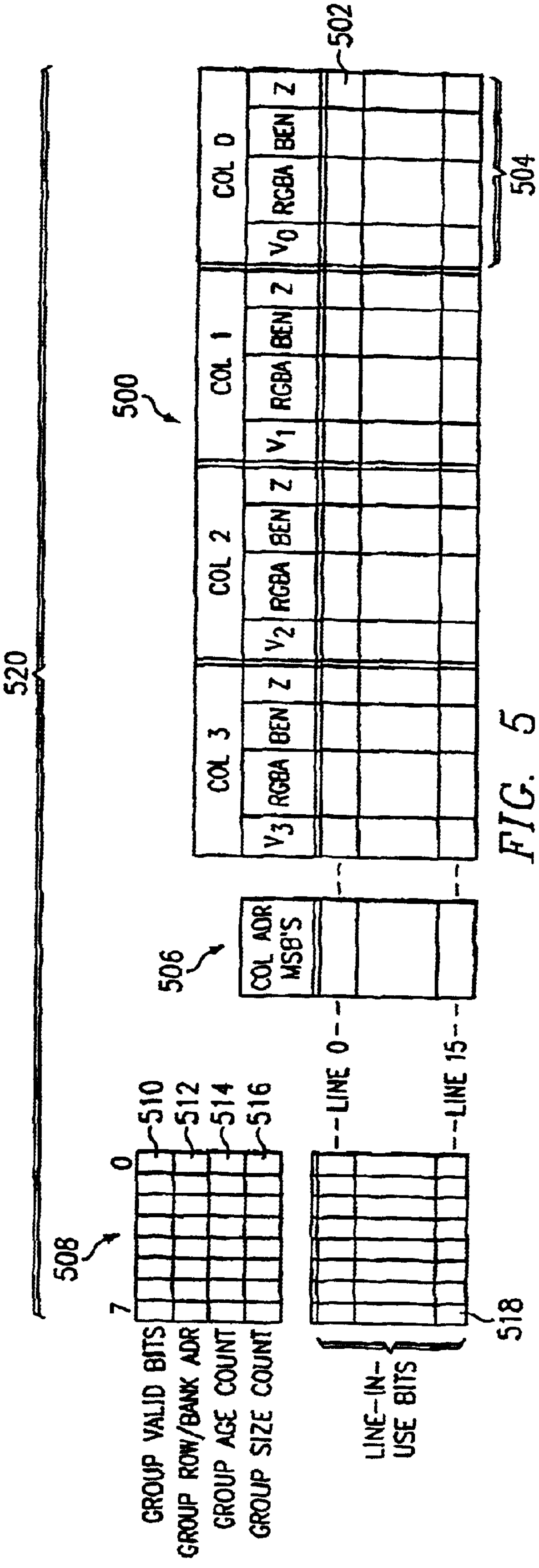
FIG. 5 is a block diagram illustrating a set of associated storage arrays according to a preferred embodiment of the invention.

The tables shown in FIG. 5 are intended to represent any hardware storage structure for storing the pieces of information indicated in the drawing, and for associating certain of the pieces of information as specified in the drawing with the use of lines and columns. In preferred embodiments, the storage structure of FIG. 5 may be implemented using latch arrays, register files or RAMs, for example. Data paths have been omitted from the drawing for clarity; but it will be understood that control mechanisms and datapaths must be provided for reading information from and writing information to each of the various storage locations identified in the figure. The preferred control mechanism for doing so would be a state machine designed to implement the state and flow diagrams of FIGS. 12–18, which are discussed in detail in section 3.

Pixel quad storage array 500 includes space for 16 lines of pixel quad entries 502. Each pixel quad entry 502 includes space for four pixel entries 504. Each pixel entry 504 includes space for a set of RGBA components, a set of four BEN bits, a z value, and a valid bit. Column MSB storage array 506 includes space for 16 lines of column address MSB entries. Each of the lines of column MSB storage array 506 is associated with one of the lines of pixel quad storage array 500. Group information storage array 508 may be used to store information pertaining to up to eight different row/bank groups at any one time. Each column in array 508 includes space for a group valid bit 510, a group row/bank address 512, a group age count 514, and a group size count 516. In addition, each column in array 508 is associated with 16 line-in-use bits 518. Each of the line-in-use bits 518 is associated with one of the lines of pixel quad storage array 500. When a line-in-use bit 518 is asserted, it signifies that the corresponding line of pixel quad storage array 500 is associated with the corresponding column of group information storage array 508. Thus, only one line-in-use bit 518 in a line of array 508 may be asserted at any one time. On the other hand, more than one line-in-use bit 518 in a column of array 508 may be asserted at the same time. (More than one line in pixel quad storage array 500 may be associated with a single row/bank group address.)

Figure 6:
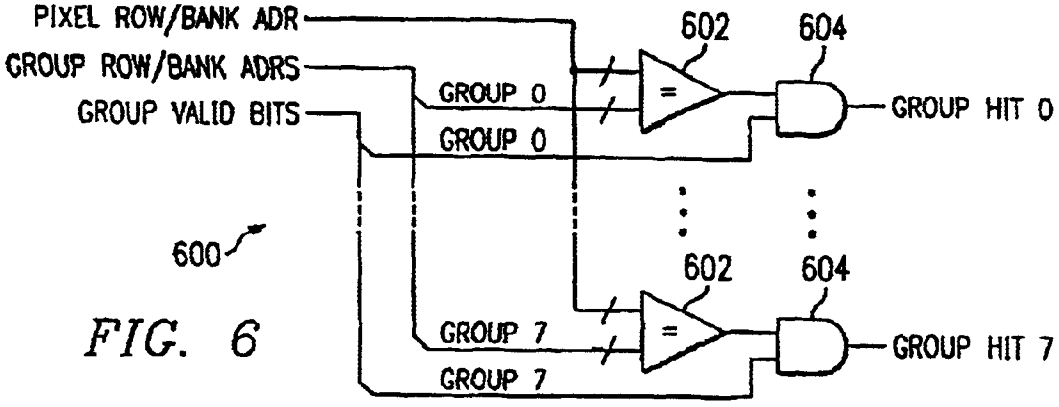
FIG. 6 is a schematic diagram illustrating a preferred group hit generation circuitry suitable for use with the storage arrays of FIG. 5.
Figure 7:
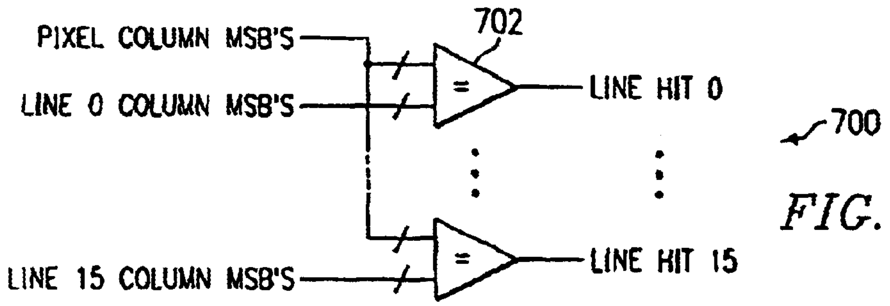
FIG. 7 is a schematic diagram illustrating a preferred line hit generation circuitry suitable for use with the storage arrays of FIG. 5.

Together, storage arrays 500, 506 and 508 form a single pixel command buffer 520 whose storage locations are dynamically-allocatable among one or more different row/bank groups. (Persons having ordinary skill in the art will appreciate that more or fewer lines and columns may be provided in any of arrays 500, 506 and 508, depending on the needs of the implementation.) As pixel commands are received at the input of batch and burst building circuitry 200, several comparators are used to determine where the pixel command should be placed in buffer 520. Those comparators are the group hit comparator 600 shown in FIG. 6, the line hit comparator 700 shown in FIG. 7, and the pixel quad hit comparator 800 shown in FIG. 8.

Group hit comparator 600 includes a set of eight comparators 602, one for each of the columns of group information storage array 508. As an input pixel command is received, the row/bank-address of the input pixel is fed to one input of all eight comparators 602. The other inputs of the eight comparators 602 are coupled to the group row/bank address field 512 in the corresponding column of array 508. The output of each comparator 602 is asserted if its two inputs are equal, and is coupled to one input of an AND gate 604. The other input of each AND gate 604 is coupled to the group valid bit 510 of the corresponding column of array 508. Thus, if the row/bank address of the input pixel matches any of the group row/bank addresses already stored in array 508, then the output of the corresponding AND gate 604 will be asserted (indicating to which group the input pixel should belong). Thus, the outputs of AND gates 604 constitute group hit signals 0–7.

Line hit comparator 700 includes a set of sixteen comparators 702, one for each of the lines of column MSB storage array 506. As an input pixel command is received, the column address MSBs of the input pixel are fed to one input of all sixteen comparators 702. The other inputs of the sixteen comparators. 702 are coupled to the corresponding line of column MSB storage array 506. The output of each comparator 702 is asserted if its two inputs are equal. Thus, if the column MSBs of the input pixel match any of the column MSBs already stored in array 506, then one of the line hit signals 0–15 will be asserted.

Figure 8:
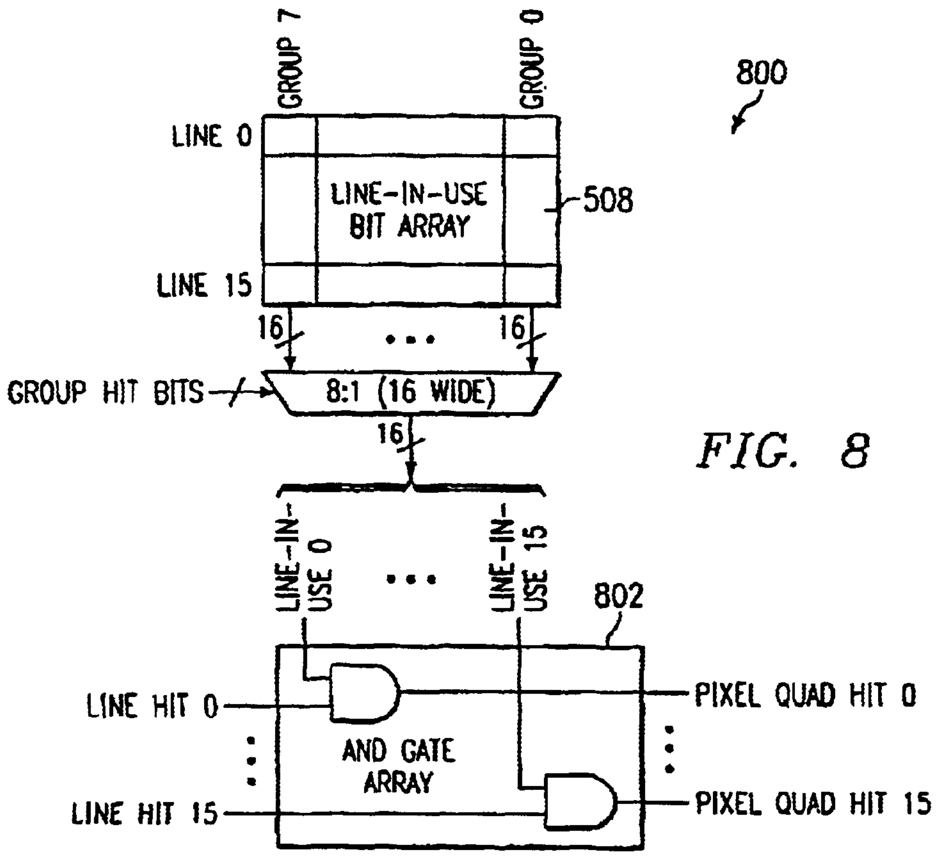
FIG. 8 is a schematic diagram illustrating a preferred pixel quad hit generation circuitry suitable for use with the storage arrays of FIG. 5.

The eight group hit signals and the sixteen line hit signals are used by pixel quad hit comparator 800 to determine whether an input pixel command matches any of the pixel quad entries 502 already allocated within array 500. As shown in FIG. 8, the group hit signals are used to select one column of line-in-use bits from array 508. The selected column of 16 line-in-use bits are then fed into AND gate array 802. AND gate array 802 includes sixteen AND gates, one for each line-in-use bit. Each line-in-use bit is coupled to one of the inputs of one of the AND gates in array 802. Another input of each AND gate is coupled to the corresponding line hit signal, as shown. The outputs of the sixteen AND gates in array 802 constitute pixel quad hit is, signals 0–15. If any of the pixel quad hit signals 0–15 is asserted, it not only signifies that the address of the input pixel matches one of the pixel quad entries 502 already allocated within buffer 520, but also identifies to which pixel quad entry 502 the input pixel should belong.

Figure 9:
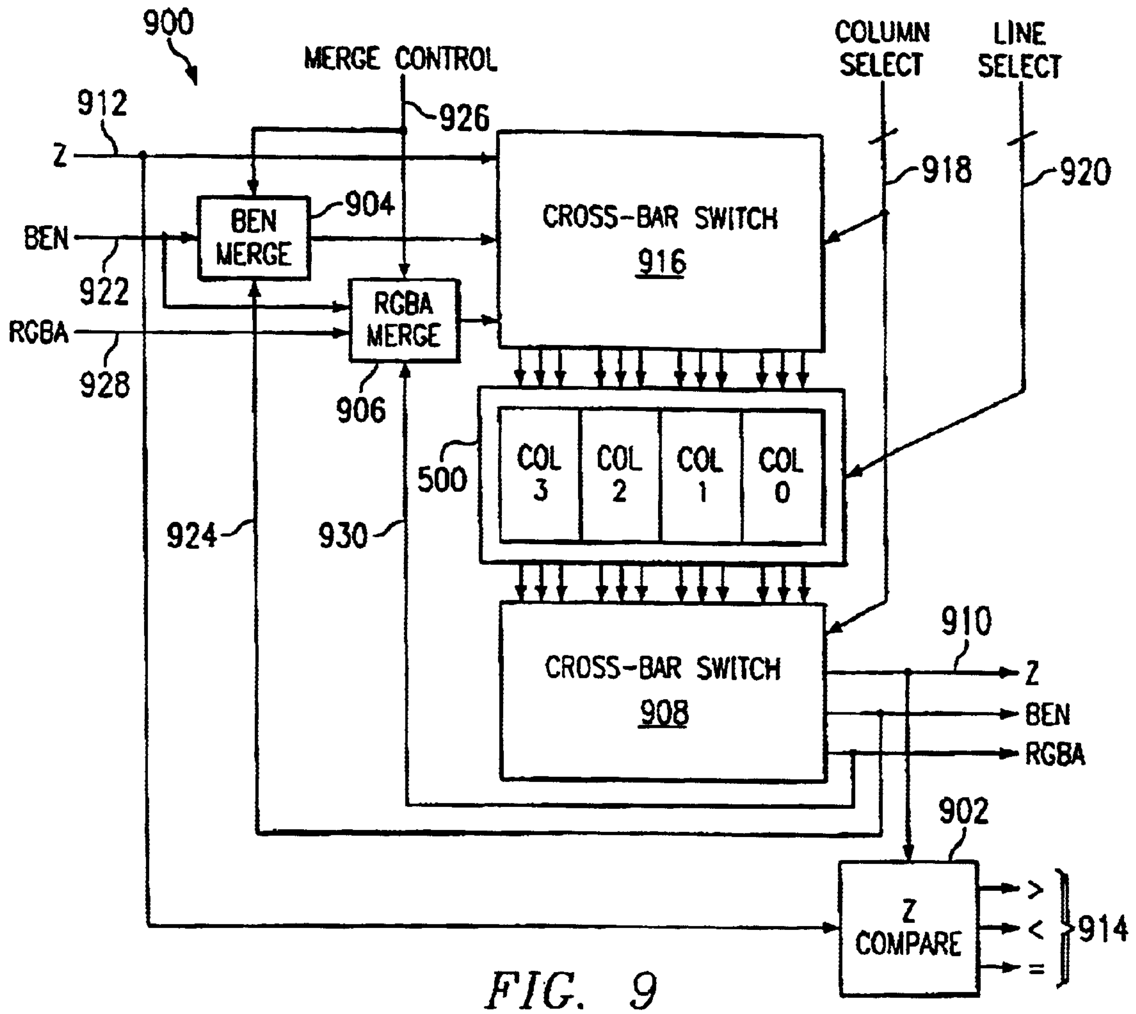
FIG. 9 is a block diagram illustrating z compare and conditional merge circuitry according to a preferred embodiment of the invention and suitable for use with the storage arrays of FIG. 5.

FIG. 9 illustrates z-test circuitry 900 that may optionally be included in batch and burst building circuitry 200. Z comparator 902 has one input coupled to one of the z values stored in array 500. This may be accomplished via a cross-bar switch 908 and an output z bus 910. Z comparator 902 has its other input coupled to the z value 912 of an input pixel command. Outputs 914 of z comparator 902 indicate whether the input pixel z value is greater than, less than or equal to the selected z value appearing on bus 910. Depending on the current mode of operation of graphics subsystem 116 and the result of the z comparison, it may be possible to disregard ("toss") the input pixel command. Alternatively, it may be possible to merge the input pixel command with -the stored command against which it was compared. If so, use is made of BEN merge block 904, RGBA merge block 906 and cross-bar switch 916. (Column select signals 918 may be derived from the LSBs of the input pixel. Line select signals 920 may be derived from the pixel quad hit signals of FIG. 8.)

Figure 10:
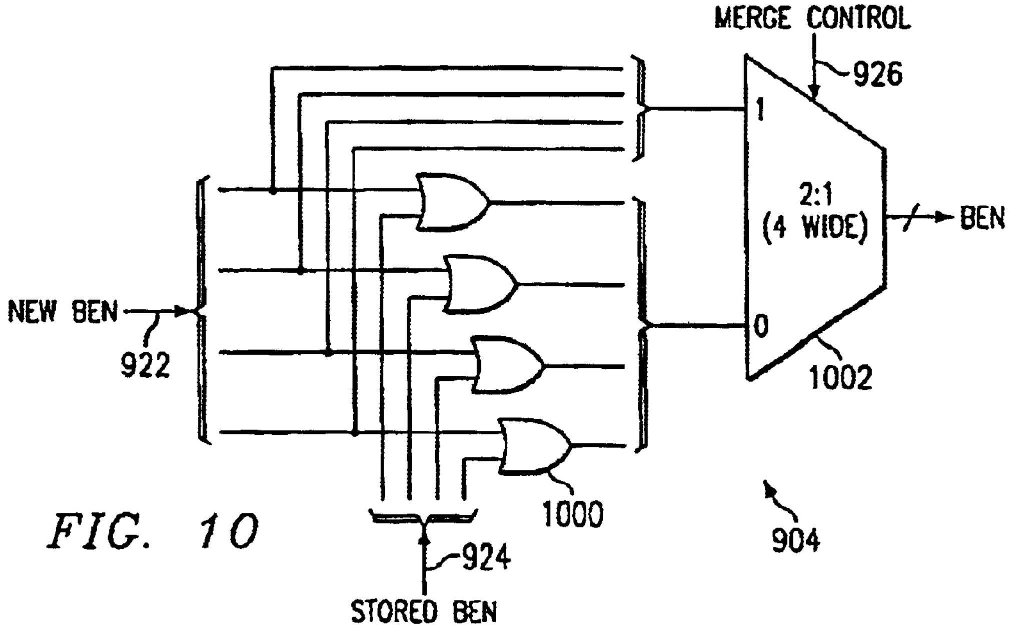
FIG. 10 is a schematic diagram illustrating the BEN merge circuitry of FIG. 9 in more detail.

FIG. 10 illustrates an example BEN merge block 904 in more detail. Each bit of the input pixel's BEN field 922 is fed to one input of one of four OR gates 1000. Each bit of the stored pixel's BEN field 924 is fed to the another input of the corresponding one of the four OR gates 1000. The outputs of the OR gates 1000 go to one input of a 2:1 (4 wide) multiplexer 1002. The other input of multiplexer 1002 is coupled to the new pixel's BEN field 922. Depending on the state of merge control signal 926, either the new pixel's BEN field appears at the output of multiplexer 1002, or the logical OR of the new pixel's BEN field and the stored pixel's BEN field. (Merge control signal 926 may be generated by the state machine that controls buffer 520.)

Figure 11:
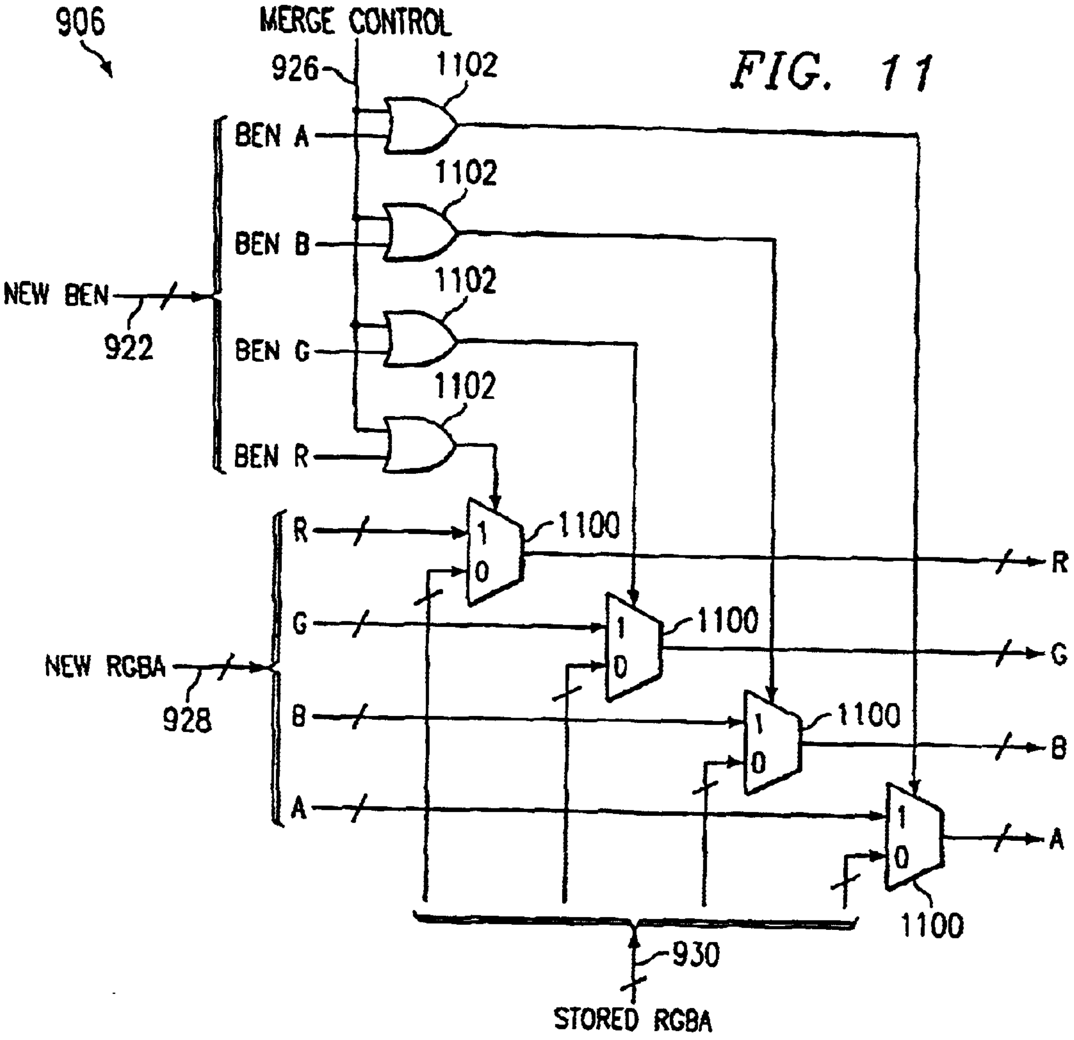
FIG. 11 is a schematic diagram illustrating the RGBA merge circuitry of FIG. 9 in more detail.
Figure 12:
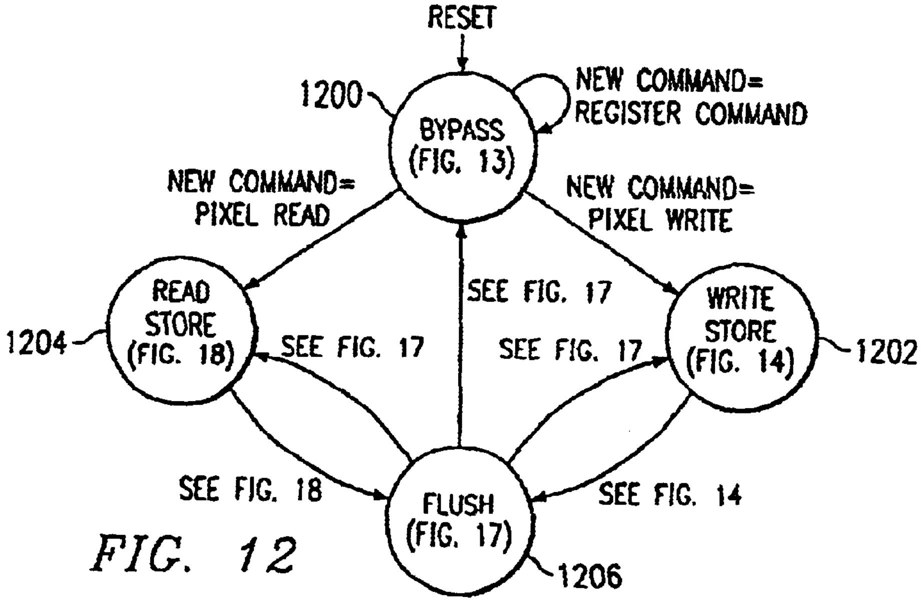
FIG. 12 is a state diagram illustrating preferred states for control circuitry to be used with the storage arrays of FIG. 5.

FIG. 11 illustrates an example RGBA merge block 906 in more detail. Each component of the new pixel's RGBA field 928 is fed to one input of one of four 2:1 multiplexers 1100. Each component of the stored pixel's RGBA field 930 is fed to the other input of the corresponding multiplexer 1100. By virtue of OR gates 1102, the following result is obtained: When merge control signal 926 is unasserted, the RGBA components appearing at the outputs of multiplexers 1100 will be either those of the new pixel or those of the stored pixel, independently, depending on the state of the new pixel's BEN bits 922. But when merge control signal 926 is asserted, only the new pixel's RGBA components 928 may appear at the output of multiplexers 1100. If a stored pixel command is to be merged with (or completely replaced by) a new pixel command, then the z value 912 of the new pixel command overwrites the stored z value, the outputs of BEN merge block 904 overwrite the stored BEN field, and the outputs of RGBA merge block 906 overwrite the stored RGBA value. (This is accomplished via cross-bar switch 916 and appropriate control signals applied to column select signals 918 and row select signals 920, as discussed above.)

3 Operation of the Preferred Embodiments

The preferred operation of batch and burst building circuitry 200 will now be described in detail with reference to FIGS. 12–18.

General states. A state machine may be constructed to control the operation of batch and burst building circuitry 200 according to the state diagram of FIG. 12. Upon reset, the machine will enter bypass state 1200, during which new pixel commands are received by batch and burst building circuitry 200. As long as the new commands received are register commands, the machine will remain in bypass state 1200. But if the new command is a pixel write command, the machine will enter write store state 1202. Alternatively, if the new command is a pixel read command, the machine will enter read store state 1204. From either write store state 1202 or read store state 1204, the machine will eventually enter flush state 1206. The conditions under which these transitions may occur will be explained with reference to FIGS. 14 and 18. From flush state 1206, the machine may return to any of the other three states in response to conditions that will be explained with reference to FIG. 17.

Figure 13:
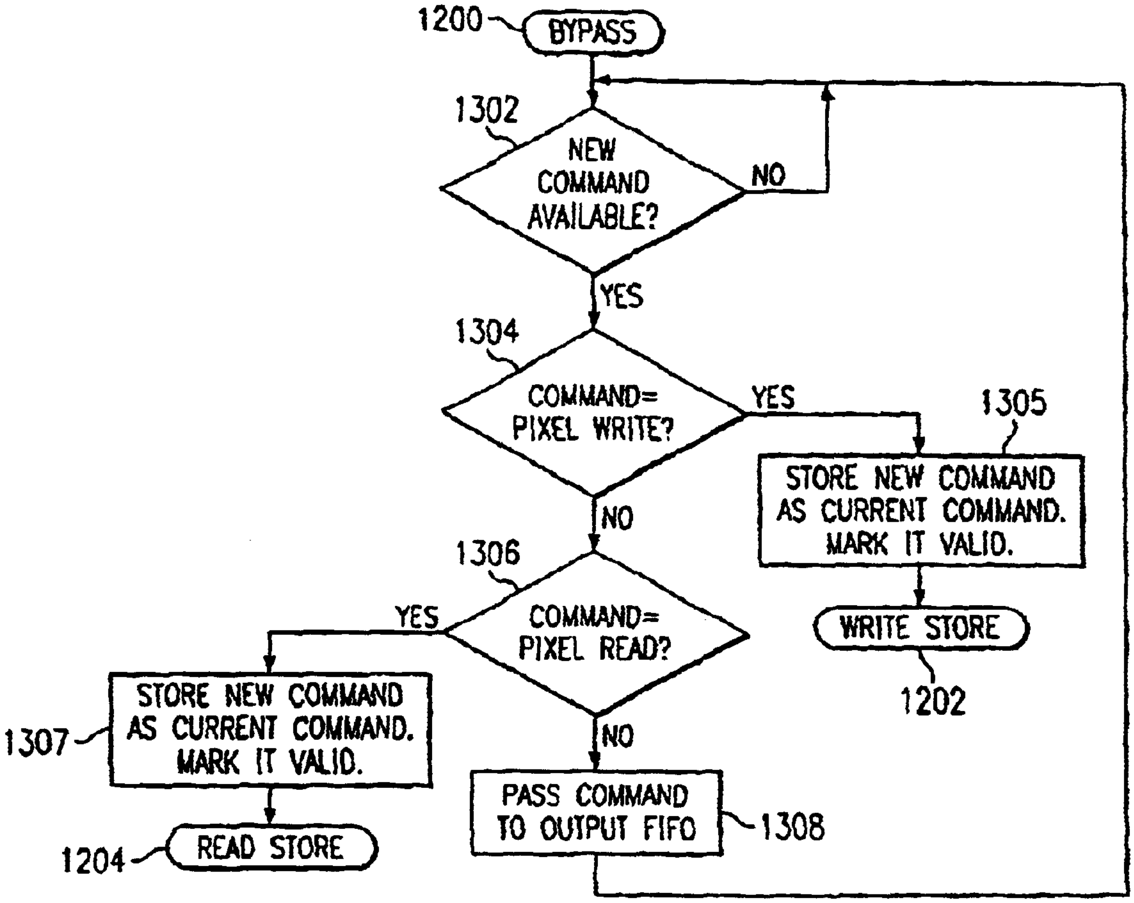
FIG. 13 is a flow diagram illustrating the bypass state of FIG. 12 in more detail.

Bypass state. FIG. 13 describes bypass state 1200 in detail. Once bypass state 1200 is entered, step 1302 loops to wait for a new command to become available at the input of batch and burst building circuitry 200 (for example, in an input FIFO). Once a new command is detected, step 1304 checks whether it is a pixel write command. If so, step 1305 stores the new command as the current command and marks the current command valid. Then the machine transitions to write store state 1202. If the new command is not a pixel write command, then step 1306 checks whether the new command is a pixel read command. If so, step 1307 stores the new command as the current command and marks the current command valid. Then the machine transitions to read store state 1204. If the new command is neither a pixel write nor a pixel read, then step 1308 simply causes the new command to be passed to the output of batch and burst building circuitry 200 (for example, to an output FIFO), and operation continues at step 1302.

Figure 14A:
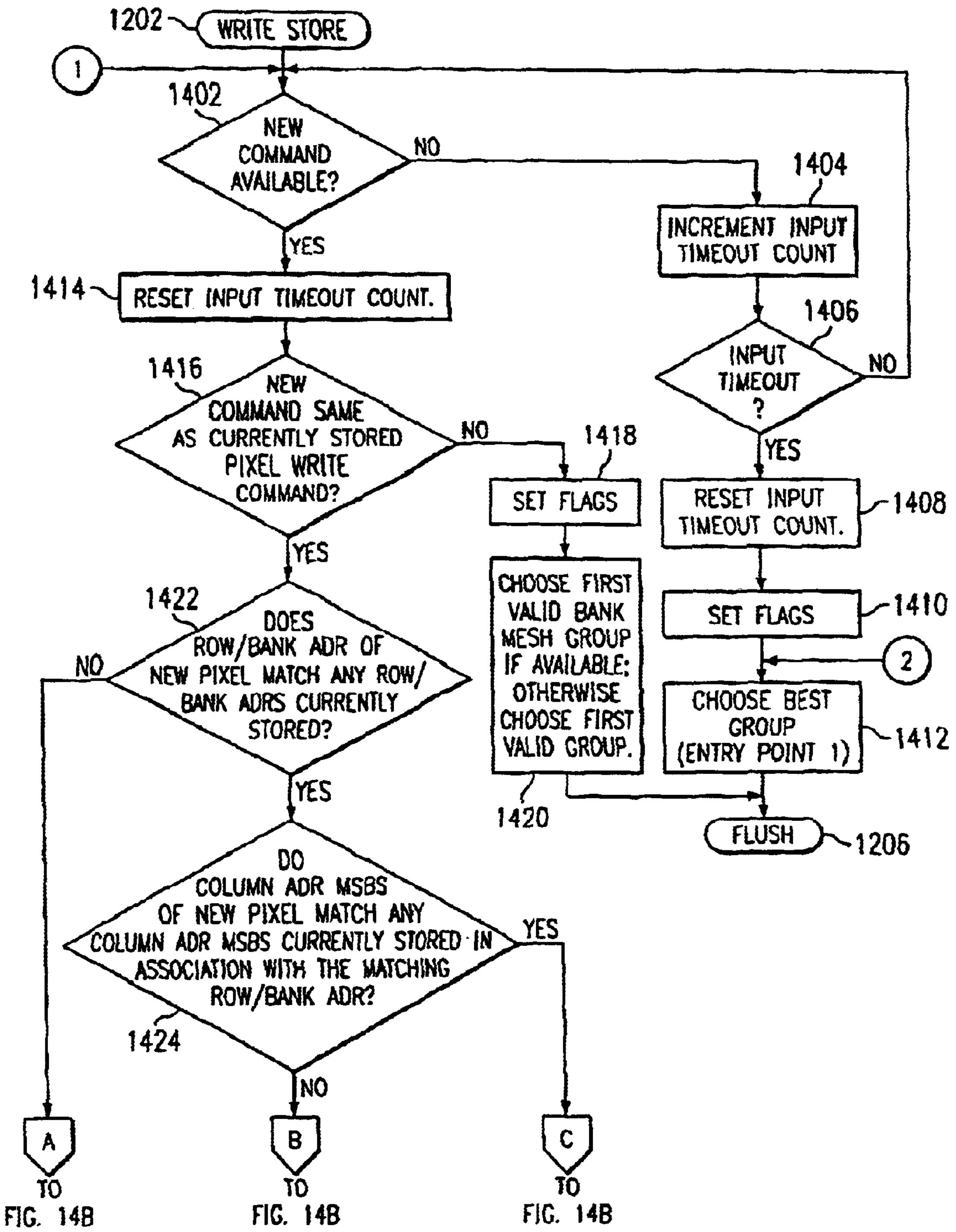
FIG. 14 is a flow diagram illustrating the write store state of FIG. 12 in more detail.
Figure 14B:
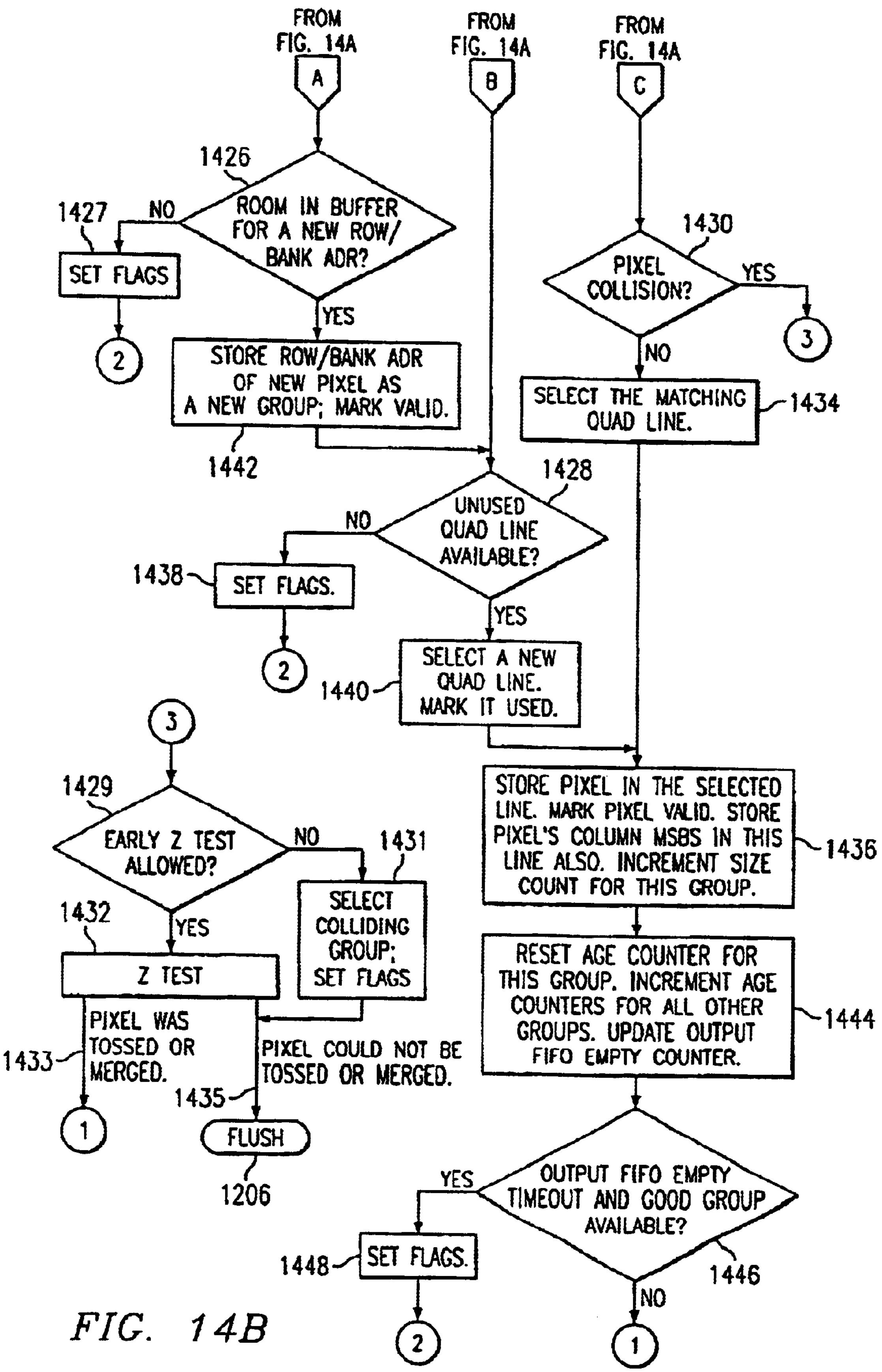

Write store state. FIG. 14 describes write store state 1202 in detail. Once write store state 1202 is entered, steps 1402, 1404 and 1406 loop to wait for a new command to become available. With each loop, an input timeout count is incremented in step 1404. If it is determined in step 1406 that an input timeout has occurred, then steps 1408, 1410 and 1412 will lead to a transition to flush state 1206. The input timeout count is reset in step 1408. Flush flags are set in step 1410 to control the manner in which the flush will occur. Specifically, a "flush all groups" flag and a "flush entire group" flag are both asserted to indicate that not only should all currently buffered groups be flushed, but each of those groups should be flushed completely. During step 1412, a "choose best group entry point 1" routine is performed to select which of the groups should be flushed first when flush state 1206 is entered. (The "choose best group entry point 1" routine will be described in detail with reference to FIG. 15.)

On the other hand, if a new command is detected at step 1402 before an input timeout occurs, then a set of steps is performed to process the input pixel command. Step 1414 resets the input timeout count. Step 1416 compares the type of input command with a stored current command type. By way of explanation, a register is used within batch and burst building circuitry 200 to store a current command type variable. Associated with the current command type variable is a valid bit. Upon the first command received in read store state 1204 or write store state 1202 (when the current command valid bit is unasserted), the current command type is set equal to the new command type and its valid bit is set. The valid bit may be unasserted again during flush state 1206, as will be further described below with reference to FIG. 17.

If step 1416 determines that the input command type does not match the current command type, then steps 1418 and 1420 will lead to flush state 1206. In step 1418, the flush all groups flag is set, and the flush entire group flag is set (as they would be in step 1410). But instead of executing the "choose best group entry point 1" routine, step 1420 selects the first valid bank mesh group, if a bank mesh group is available (bank mesh groups are defined at step 1506 of FIG. 15 and the accompanying text); if a valid bank mesh group is not available, step 1420 simply selects the first valid group (for example, by parsing group valid bits 510 in order from lowest to highest to find the first asserted valid bit). Then, a transition occurs to flush state 1206.

If step 1416 determines that the input command type does match the current command type, then operation continues at step 1422. Step 1422 determines whether the row/bank address of the new pixel command matches any of the row/bank groups currently stored in buffer 520 (for example, by using the circuitry of FIG. 6). If not, then operation continues with step 1426. If so, step 1424 checks the pixel quad hit signals of FIG. 8 to determine whether the input pixel command maps to any pixel quad entries 502 already allocated in buffer 520. If so, step 1430 checks the valid bit of the column in array 500 corresponding to the two LSBs of the new pixel's column address. If the valid bit is asserted, then we have a "pixel collision." In the event of a pixel collision, operation may continue with a z test routine 1432 in implementations that include z test circuitry 900, provided that early z test is allowed as determined in step 1429. (Early z test would not be allowed, for example, if the current rendering mode included stencil test.) In implementations that do not include z test circuitry 900, or if early z test is not allowed, the state machine should simply select the colliding group and set the flushing flags in step 1431 (flush all groups=0, flush entire group=1), and then transition to flush state 1206. On the other hand, if step 1430 determines that no pixel collision has occurred, then step 1434 selects the line of array 500 indicated by the pixel quad hit signals, and step 1436 stores the new pixel information in that line, in the column corresponding to the new pixel's column LSBs. The valid bit for this column is asserted, and the new pixel's column MSBs are stored in the corresponding line of array 506. The size count for the group is then incremented.

If step 1424 determines that there is no pixel quad hit, then step 1428 checks line-in-use bits 518 to determines whether any unused lines of array. 500 are available to be allocated to a new pixel quad. If not, then buffer 520 is full and flushing is necessary. So steps 1438 and 1412 will lead back to flush state 1206. In step 1438, both the flush all groups flag and the flush entire group flag are left unasserted; only a portion of a group need be flushed in order to continue operation. But if step 1428 determines that an unused pixel quad entry 502 is available, it is allocated to the new pixel's group in step 1440 by asserting the appropriate line-in-use bit in array 508, z and operation continues at step 1436.

If step 1426 is reached from step 1422, the new pixel does not belong to any currently stored groups. Therefore, step 1426 determines whether there is room available in array 508 for a new row/bank address group (for example, by checking group valid bits 510). If not, then at least one group must be flushed; step 1427 sets the flush entire group flag, leaves the flush all groups flag unasserted, and operation continues at step 1412. If so, then step 1442 stores the row/bank address of the new pixel in an unused group row/bank address entry 512 and asserts the corresponding group valid bit 510; operation continues with step 1428.

After any new pixel is stored in buffer 520 at step 1436, step 1444 adjusts the group size count 516 for the affected group, and all of the group age counts 514. Specifically, the age count for the affected group is reset to zero, but the age count for all other valid groups is incremented. A counter that keeps track of how long the output FIFO has been empty is also updated in step 1444. Then, step 1446 determines whether an output empty timeout has occurred, and whether a "good group" is available for flushing. If both conditions are true, then the flush all groups flag and the flush entire group flag are both unasserted in step 1448 and operation continues at step 1412. If not, then operation continues at step 1402.

Figure 15A:
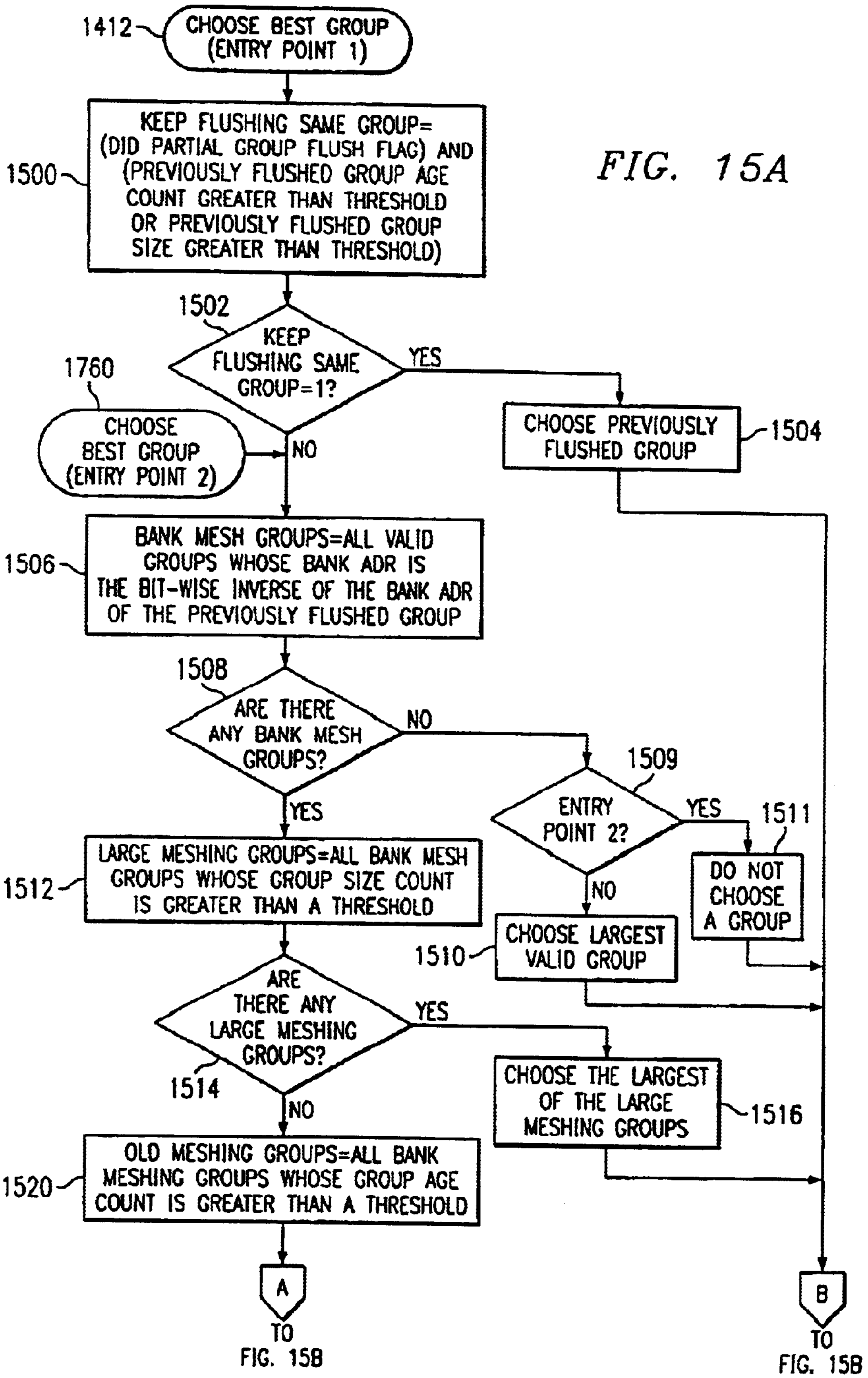
FIG. 15 is a flow diagram illustrating the choose best group routines of FIGS. 14 and 17 in more detail.
Figure 15B:
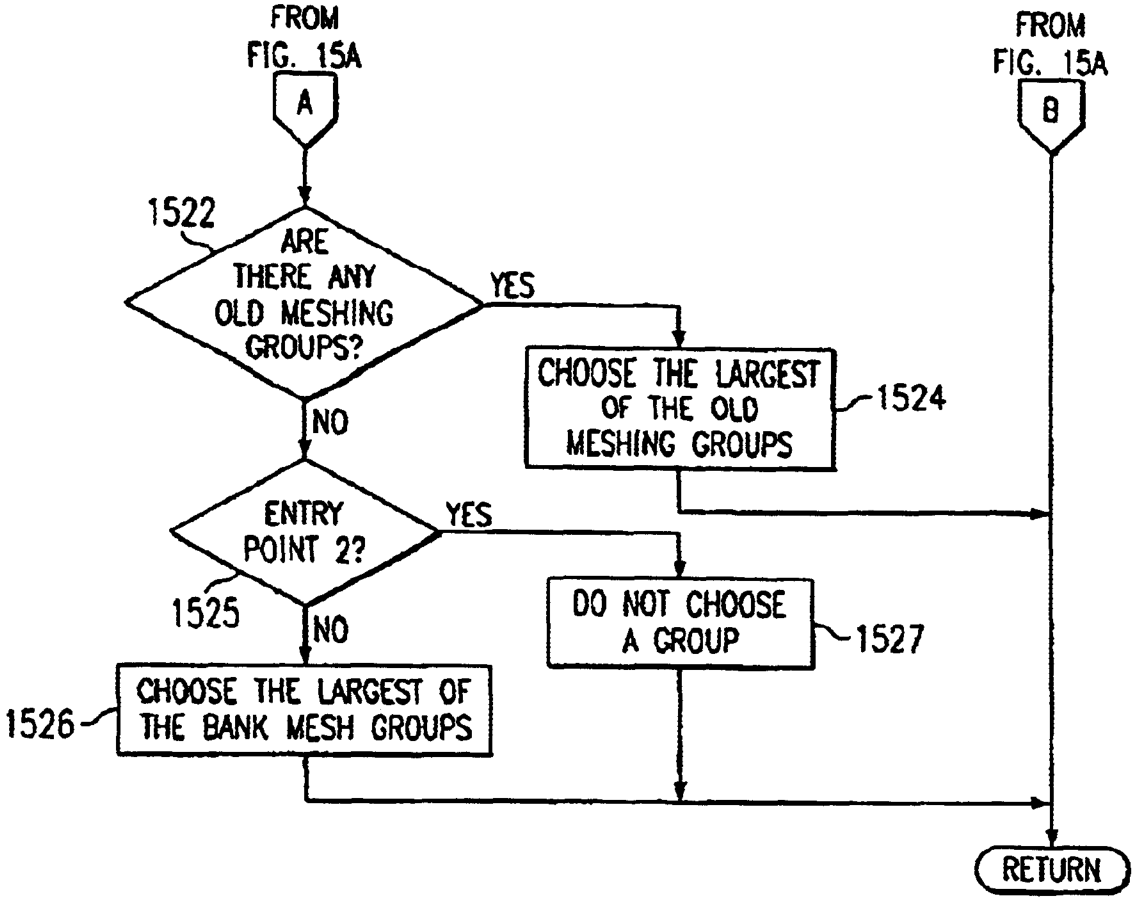
Figure 16:
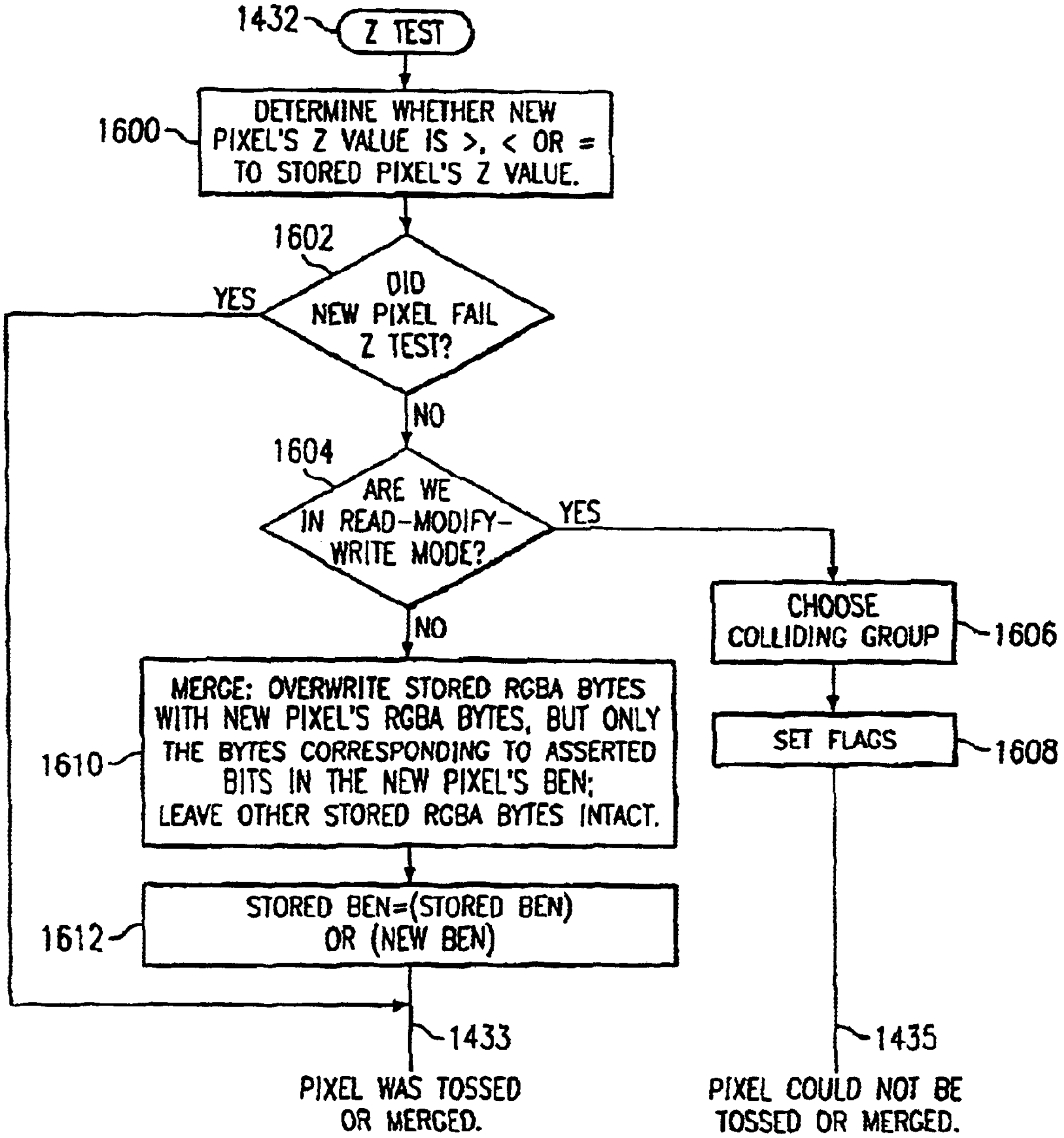
FIG. 16 is a flow diagram illustrating the z test routine of FIG. 14 in more detail.
Figure 17A:
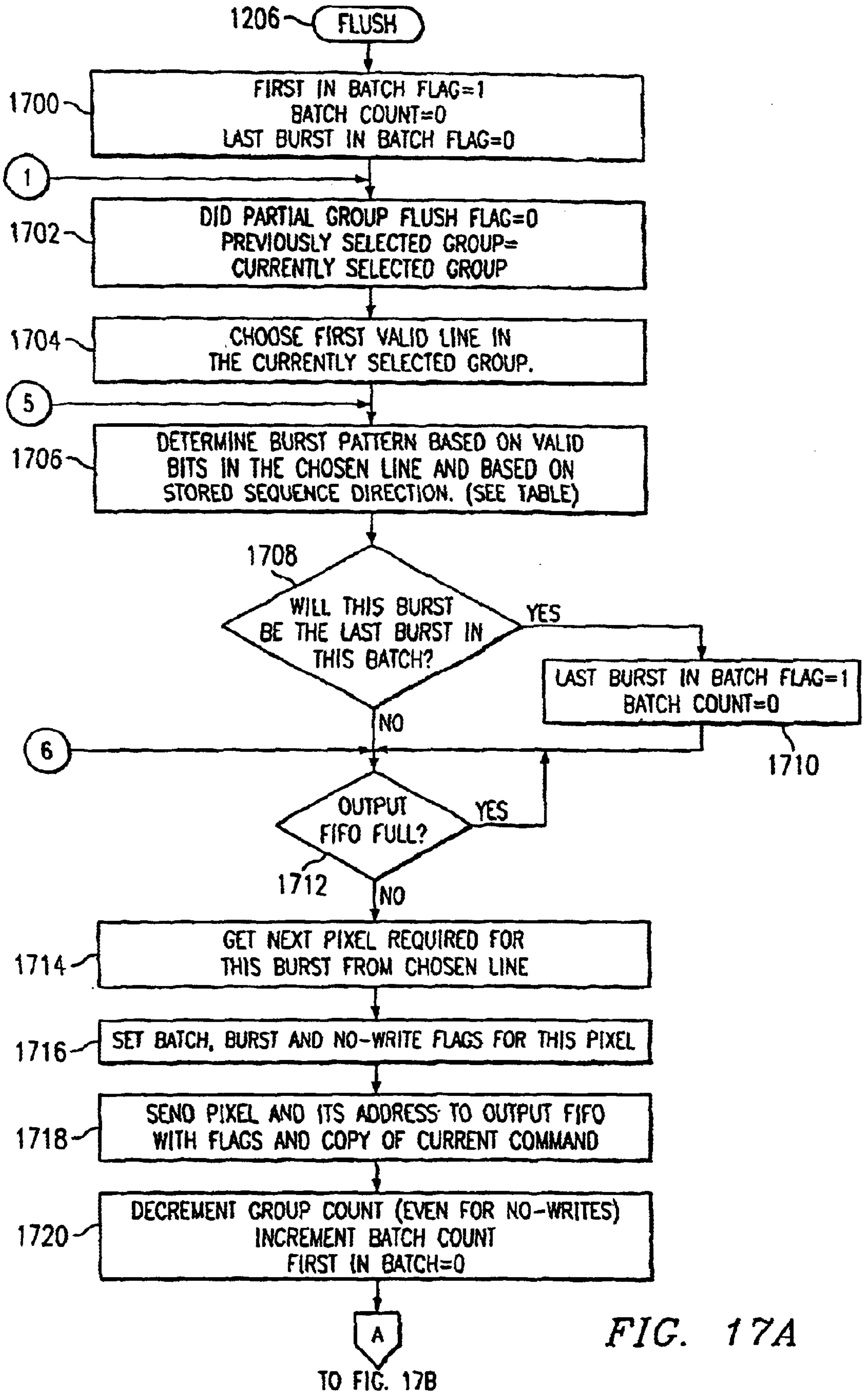
FIG. 17 is a flow diagram illustrating the flush state of FIG. 12 in more detail.
Figure 17B:
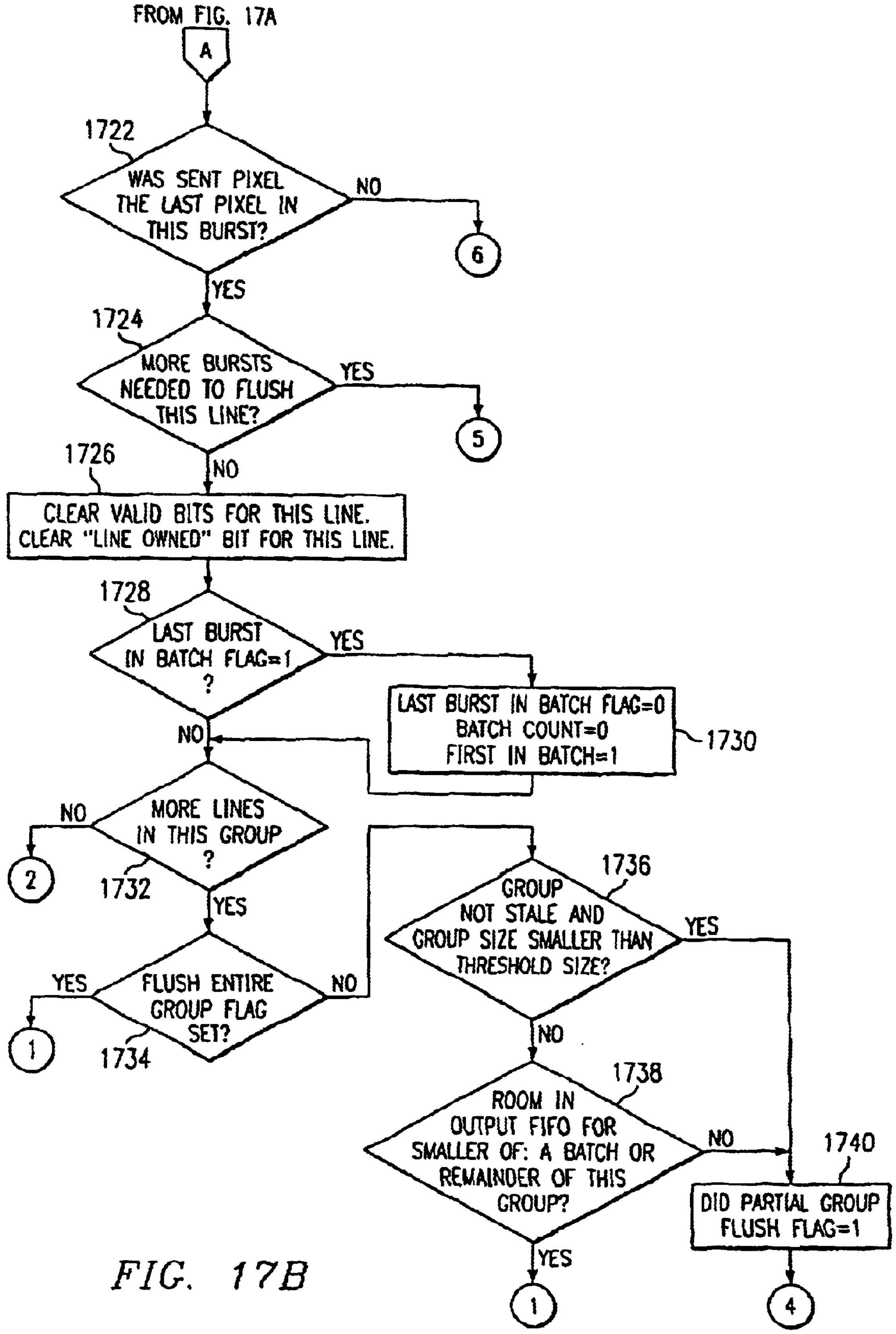
Figure 17C:
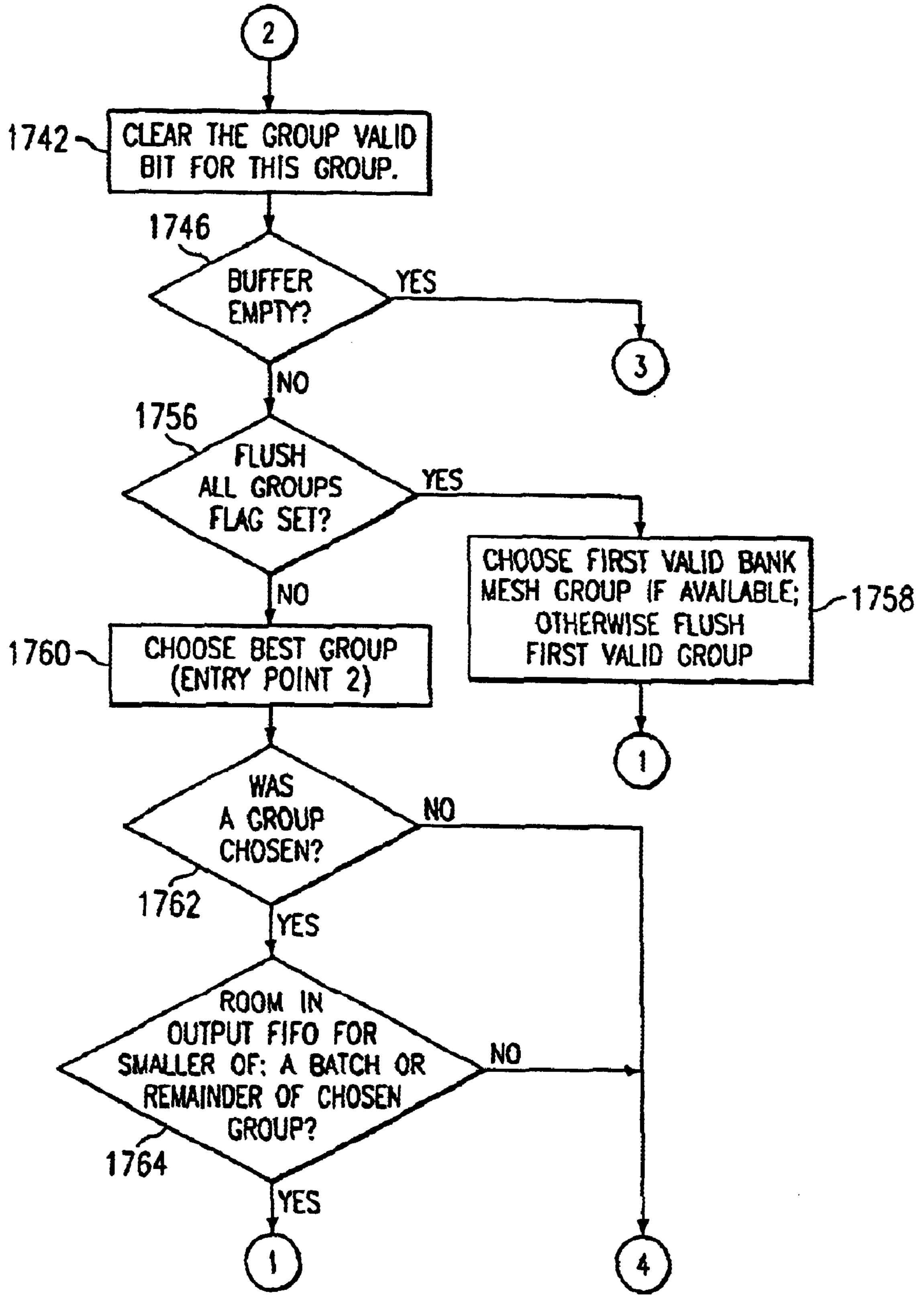
Figure 17D:
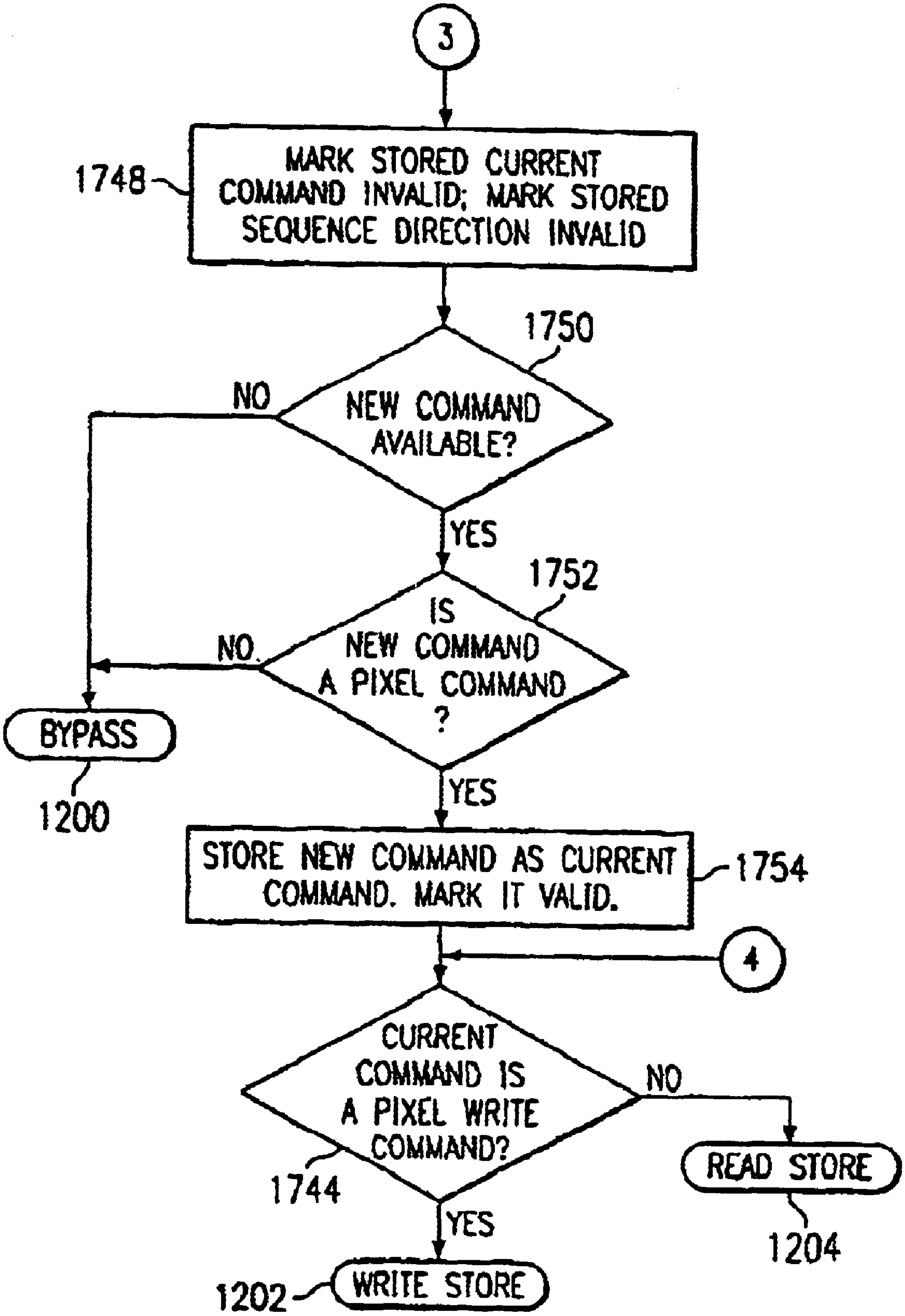

It will be helpful to describe at this point a bank sequencing problem that is peculiar to computer graphics systems: Because a single pixel access command may result in numerous frame buffer memory access (image buffer and z buffer), it becomes important to map the image buffer and z buffer in the frame buffer memory appropriately so as to avoid frequent same-bank page changes. In a preferred embodiment, the image buffer and z buffer for a given pixel were mapped into banks whose binary addresses were the bit-inverse of one another. Thus, if the image buffer location for a given pixel were in bank 01, then the z buffer location for that pixel would be in bank 10. When batching in such an environment, it is a good idea to sequence entire batches with this memory mapping concept in mind: Thus, if a first batch of memory access commands is directed to pixels whose image data resides in a first bank, then the next sequential batch should be directed to pixels whose image data resides in a bank whose binary address is neither equal to nor is the bit inverse of the first bank's binary address. Such a sequencing reduces same-bank page changes even when z test is enabled, so that both image buffer accesses and z buffer accesses result from the memory access commands in each batch. The decision tree illustrated in FIG. 15 is intended, among other things, to effect just such a sequencing of batches. The process of selecting groups whose bank addresses are neither equal to nor are the bit inverse of those in the previous group will be referred to herein as selecting a "bank mesh" group.

The determination in step 1446 (and in step 1828 of the read store state) that asks whether "a good group is available" for flushing is similar to the decision tree of FIG. 15, and will be described here before FIG. 15 is discussed. Basically, the "is a good group available for flushing" determination tracks the decision tree FIG. 15 except that, instead of selecting a particular group for flushing, the "is a good group available" determination simply returns a yes or no answer: To determine whether a good group is available for flushing, first determine condition 1: [Did the previous flush operation leave a group partially unflushed?] AND [Is that group's age older than a threshold age? OR Is that group's size larger than a threshold size?]. If step condition 1 is satisfied, then a good group is available for flushing. If not, then determine condition 2: [Are there any "bank mesh groups" extant in buffer 520 whose group size exceeds a threshold size?]. If condition 2 is satisfied, then a good group is available for flushing. If not, then determine condition 3: [Are there any "bank mesh groups" extant in buffer 520 whose group age exceeds a threshold age?]. If condition 3 is satisfied, then a good group is available for flushing. If not, then no good groups are available for flushing.

The "choose best group" routine of FIG. 15 has two different entry points. Entry point 1 is used by write store state 1202. Entry point 2 is used by flush state 1206. Step 1500 determines condition 1: [Did the previous flush operation leave a group partially unflushed?] AND [Is that group's age older than a threshold age? OR Is that group's size larger than a threshold size?]. If step 1502 determines that condition 1 is satisfied, then step 1504 selects the partially unflushed group. If not, then step 1506 determines the bank mesh groups. If it is determined in step 1508 that there are no bank mesh groups available, then the next step depends on whether the decision tree was entered by entry point 1 or 2 (as indicated by decision 1509). If entry point was 1, then step 1510 selects the largest valid group. If entry point was 2, then no group is selected (step 1511).

If step 1508 determines that there is at least one bank mesh group available, then steps 1512 and 1514 determine whether any of them exceed a threshold size. If so, then step 1516 selects the largest of those. If not, then steps 1520 and 1522 determine whether any of the bank mesh groups are older than a threshold age. If so, then step 1524 selects the largest of those. If none are older than a threshold age, then the next step depends on the entry point (decision 1525). If the entry point was 1, then step 1526 selects the largest of the bank mesh groups. If the entry point was 2, then no group is selected (step 1527).

Z test. The optional z test routine of step 1432 will now be described with reference to FIG. 16. Step 1600 checks outputs 914 of z comparator 902 to determine whether the new pixel's z value is greater than, less than or equal to the colliding pixel's z value. Step 1602 determines, based on the outcome of step 1600 and based on the current z rule, whether the new pixel failed the z test. If so, then it is ignored ("tossed") and operation continues at step 1402 via path 1433. If not, then step 1604 determines, based on the current rendering mode, whether the new pixel command can be merged with the colliding stored pixel command. (The pixel commands cannot be merged if the rendering mode is read-modify-write.) If the commands cannot be merged because the machine is doing read-modify-writes, then the batch being created must be called complete: Step 1606 selects the colliding group, and step 1608 sets the flags for flushing: The flush all groups flag is set to 0; the flush entire group flag is set to 1; and the machine transitions to flush state 1206 via path 1435. But if step 1604 determines that the pixel commands can be merged, then the two colliding pixels are merged in steps 1610 and 1612, for example by using z test circuitry 900 in accordance with the technique described above with reference to FIGS. 9–11. To the extent that pixel collisions can be handled in this manner during batch building time by either tossing the new pixel or merging it with a stored pixel, average batch size will be increased over that of prior art batch building systems, thus improving frame buffer memory bandwidth efficiency.

Flush state. Flush state 1206 will now be described in detail with reference to FIG. 17. Step 1700 initializes the FIB flag to 1, the LIB flag to 0, and a batch count to 0. Step 1702 sets a did-partial-group-flush flag to 0, and sets a previously-flushed-group variable equal to the currently selected group. Step 1704 parses the line-in-use bits corresponding to the currently selected group and selects the lowest numbered line in the currently selected group. Step 1706 analyzes the valid bits in quad pixel storage array 500 on the selected line, as well as the stored sequence direction indicator (see FIG. 18 for more explanation of the sequence direction indicator), to determine an appropriate burst type and pattern for flushing the line based on the type of memory devices being used to implement the frame buffer memory (SDR or DDR devices). Table 1 is included here to indicate appropriate burst types and patterns. (Note: Table 1 assumes an incrementing direction, rather than a decrementing direction, for bursts; where a decrementing burst is to be used, columns entries in the table should be reversed.)

| Valid Bits | | | | DDR | | SDR | |
|---|---|---|---|---|---|---|---|
| v3 | v2 | v1 | v0 | burst | column | burst | column |
| 0 | 0 | 0 | 0 | * | * | * | * |
| 0 | 0 | 0 | 1 | 2 | 0, 1 | 1 | 0 |
| 0 | 0 | 1 | 0 | 2 | 0, 1 | 1 | 1 |
| 0 | 0 | 1 | 1 | 2 | 0, 1 | 2 | 0, 1 |
| 0 | 1 | 0 | 0 | 2 | 2, 3 | 1 | 2 |
| 0 | 1 | 0 | 1 | 4 | 0, 1, 2, 3 | 1; 1 | 0; 2 |
| 0 | 1 | 1 | 0 | 4 | 0, 1, 2, 3 | 1; 1 | 1; 2 |
| 0 | 1 | 1 | 1 | 4 | 0, 1, 2, 3 | 2; 1 | 0, 1; 2 |
| 1 | 0 | 0 | 0 | 2 | 2, 3 | 1 | 3 |
| 1 | 0 | 0 | 1 | 4 | 0, 1, 2, 3 | 1; 1 | 0; 3 |
| 1 | 0 | 1 | 0 | 4 | 0, 1, 2, 3 | 1; 1 | 1; 3 |
| 1 | 0 | 1 | 1 | 4 | 0, 1, 2, 3 | 2; 1 | 0, 1; 3 |
| 1 | 1 | 0 | 0 | 2 | 2, 3 | 2 | 2, 3 |
| 1 | 1 | 0 | 1 | 4 | 0, 1, 2, 3 | 1; 2 | 0; 2, 3 |
| 1 | 1 | 1 | 0 | 4 | 0, 1, 2, 3 | 1; 2 | 1; 2, 3 |
| 1 | 1 | 1 | 1 | 4 | 0, 1, 2, 3 | 2; 2 | 0, 1; 2, 3 |

Step 1708 checks the batch count and burst type to determine if this will be the last burst in the current batch. (In an embodiment, a maximum batch size was chosen to be 18 pixel commands; in other embodiments, other maximum batch sizes may be chosen.) If so, then step 1710 asserts the LIB flag and resets the batch count. Step 1712 loops until there is room in the output FIFO for output. Steps 1714–1724 loop until the selected quad pixel entry 502 has been completely flushed. In step 1714, pixel information is extracted from the quad pixel entry 502 as needed to fill in the burst pattern chosen from Table 1. As each pixel is extracted, step 1716 sets the flags of FIG. 3 appropriately for that pixel. Step 1718 sends the pixel information, with the flags, and with a copy of the stored current command, to the output FIFO. Step 1720 decrements the group count 514 for the affected group, increments the batch count, and resets the FIB flag. Step 1722 loops if there are more pixels in the burst to be flushed. Step 1724 loops back if more bursts are need to flush the line (used in the case of SDR devices).

After the pixel quad entry has been flushed, step 1726 clears the valid bits and the line-in-use bits corresponding to the flushed line. Step 1728 determines if the LIB flag is set. If so, step 1730 resets the LIB flag and the batch count, and asserts the FIB flag. If no more pixel quad entries remain in this group as determined in step 1732, then operation continues with step 1742, wherein the valid bit 510 for the current group is cleared. But if more pixel quad entries remain in this group, step 1734 checks the flush-entire-group flag to determine whether the remaining lines must be flushed. If so, operation resumes at step 1702.

If not, steps 1736 and 1738 determine whether it is appropriate to leave the group partially unflushed. It is important to note that this partial group flush capability will effectively override the "bank mesh" batch sequencing described above whenever it is appropriate to do so. (Such an override would be the preferred mode of operation if the frame buffer controller does not automatically close the page at the end of a batch, and if the partially flushed group is large or old. Under these conditions, it is usually better to continue flushing the partially flushed group than to choose a new group simply because the new group was a "bank mesh" group.) The machine will leave the group partially unflushed if the current group is not older than a threshold age AND is smaller than a threshold size (step 1736) OR if the output FIFO does not contain enough room for the smaller of a batch or the remainder of this group (step 1738). If a partial flush is indicated, step 1740 sets the did-partial-group-flush flag and the machine transitions to either read store state 1204 or write store state 1202 depending on the current command type (step 1744).

Figure 18A:
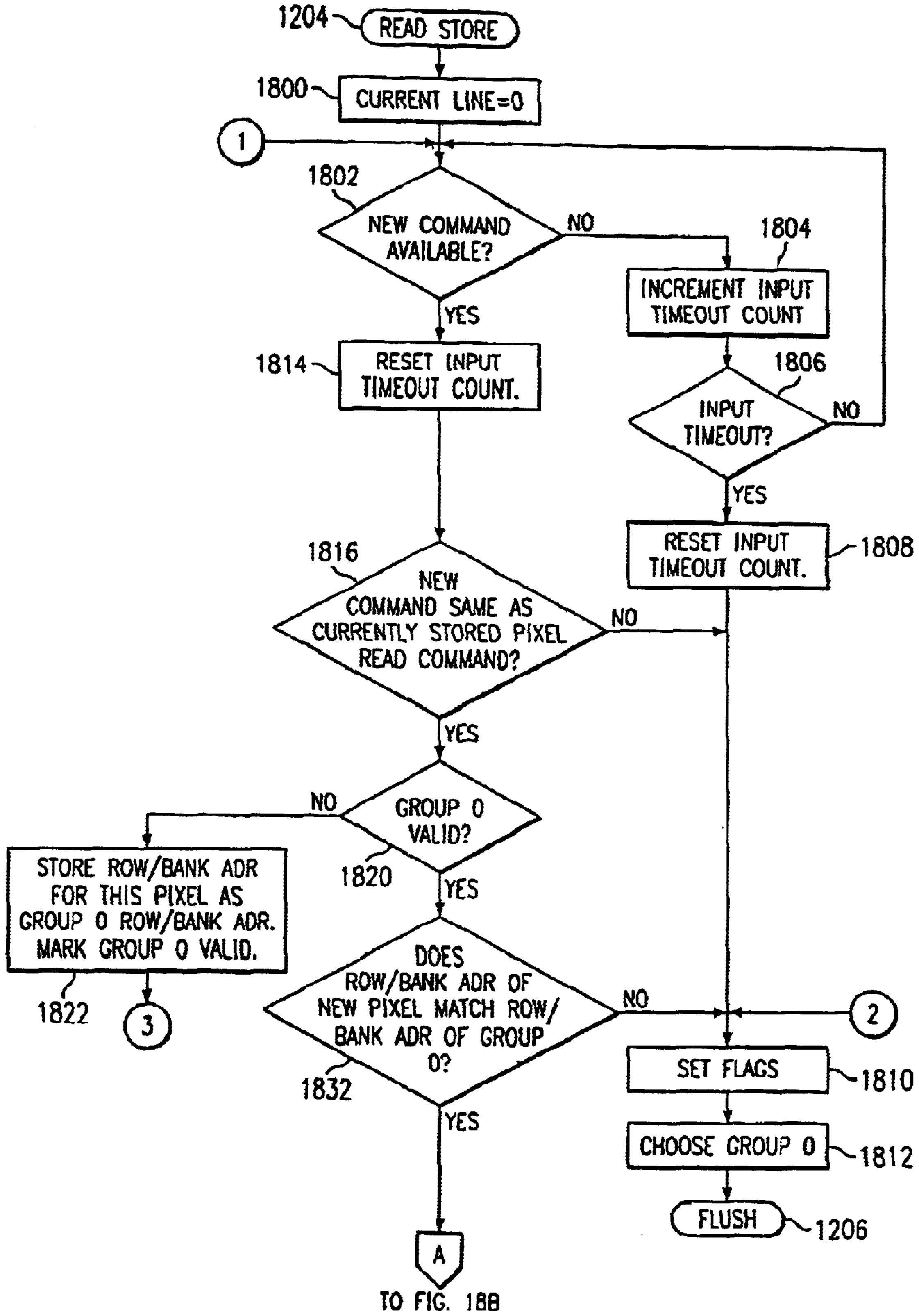
FIG. 18 is a flow diagram illustrating the read store state of FIG. 12 in more detail.
Figure 18B:
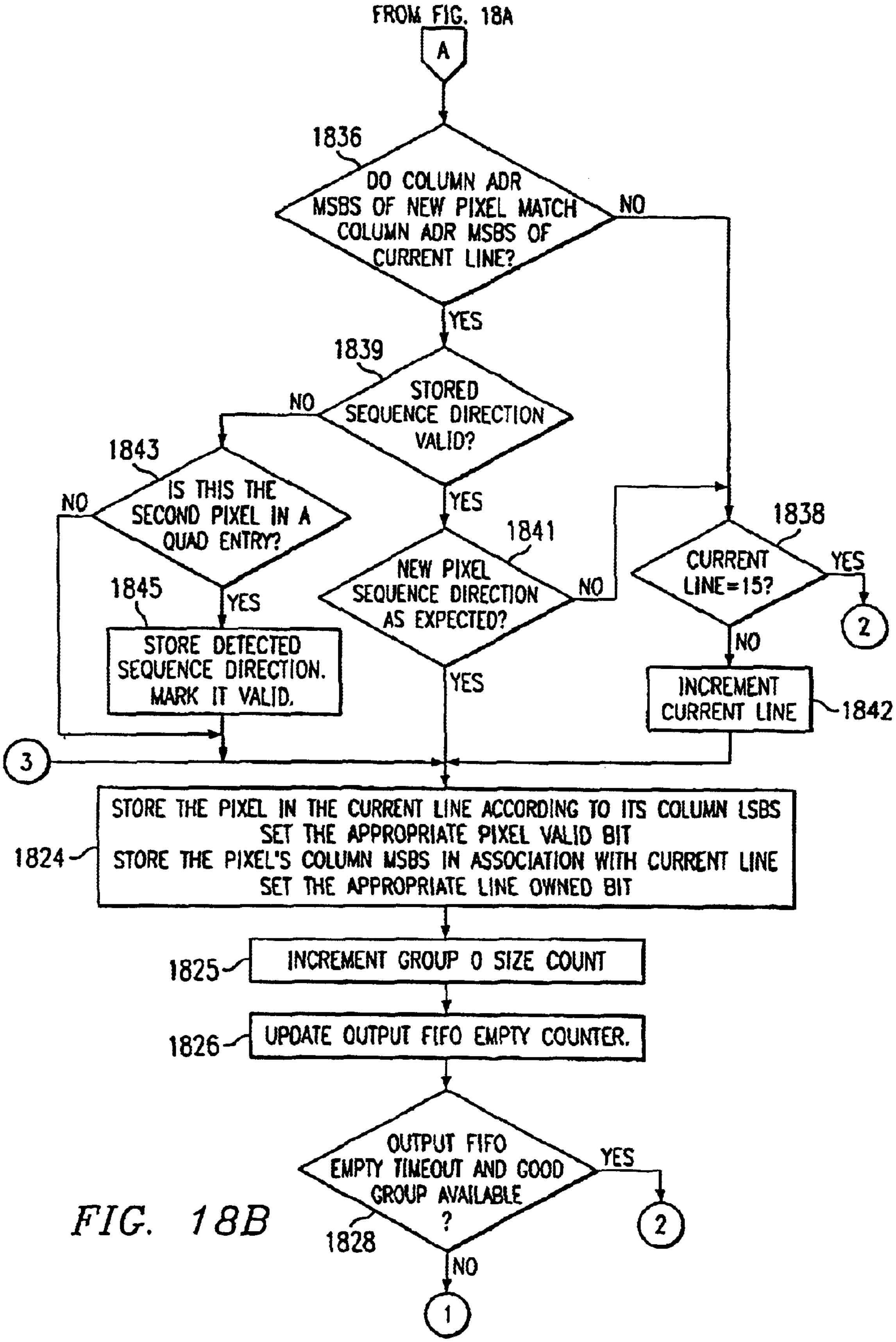

If buffer 520 is determined to be empty (step 1746), then operation continues at step 1748, wherein the stored current command is marked invalid and the stored sequence direction indicator is marked invalid (see FIG. 18 for more explanation of the sequence direction indicator). Then, step 1750 checks the input FIFO to determine whether a new command is available. If one is not available, then the machine transitions to bypass state 1200. But if one is available, then step 1752 determines whether it is a pixel command. If the new command is not a pixel command, the machine transitions to bypass state 1200. But if the new command is a pixel command, then step 1754 stores it as the new stored current command and marks the stored current command valid. The machine will then transition to either read store state 1204 or write store state 1202 depending on the new command (step 1744).

If step 1746 determines that buffer 520 is not empty, then step 1756 checks the flush-all-groups flag. If it is set, then step 1758 chooses the first valid bank mesh group if one is available; if not, step 1758 simply chooses the first valid group. Then, operation resumes at step 1702. If the flush-all-groups flag is not set, then step 1760 executes the "choose best group entry point 2" routine of FIG. 15. If no group is selected after executing the routine, then step 1762 leads to a state transition according to the current command type (step 1744). But if a group was chosen, then flushing will continue at step 1702 if room exists in the output FIFO for the smaller of a batch or the remainder of the chosen group (step 1764). Otherwise, a state transition will occur according to the current command type (step 1744 again).

Read store state. Read store state will now be described in detail with reference to FIG. 18. In an embodiment, pixel command re-ordering was not allowed for reads. Thus, read store state 1204 is simplified relative to write store state 1202 (which does allow pixel command reordering). In alternative embodiments wherein pixel command reordering is allowed for reads, read store state 1204 would be identical to write store state 1202. One significant difference between read store state 1204 and write store state 1202 is that, in the read store state, only one group row/bank address is stored in buffer 520 at any one time; when pixel commands are encountered that do not match the currently-buffered row/bank address, the buffer contents are flushed. Moreover, because only one group row/bank address is buffered at a time, the "choose best group" routine is never used prior to flushing. Instead, group 0 is simply selected for flushing. (step 1812). Another significant difference is that pixel quad entries 502 are filled in sequentially from line 0 to line 15. If an incoming pixel does not belong to the pixel quad currently being filled in, then the line counter is simply incremented, and the new pixel is placed in the pixel quad of the next line in array 500 (until the array is filled).

Step 1800 initializes a current line count to zero. Steps 1802–1806 loop until either a new command is available at the input FIFO or there is an input timeout. If an input timeout occurs, then step 1808 resets the input timeout count, and step 1810 sets the flush flags as: flush entire group=1, and flush all groups=(don't care). Step 1812 chooses the first valid group (group 0), and the machine transitions to flush state 1206.

If a new command and is detected before an input timeout occurs, then step 1814 resets the input timeout count, and step 1816 determines if the new command is identical to the stored pixel read command. If not, operation continues with step 1810. (The buffer is flushed.) But if the new command is identical, then step 1820 determines whether group 0 is valid. If group 0 is not valid, then the row/bank address of the new pixel command is stored into row/bank address field 512 for group 0 (step 1822), and the pixel is stored in the buffer (step 1824). Group 0 size count is incremented (step 1825). The output FIFO empty counter is updated in step 1826. And step 1828 will result in a flush if an output FIFO empty timeout has occurred and a "good group" is available for flushing. Otherwise, operation continues at step 1802.

If, on the other hand, step 1820 determines that group 0 is valid, then step 1832 determines whether the new pixel's row/bank address matches that of group 0. If not, the buffer is flushed. But if the row/bank address of the new pixel does match that of group 0, then step 1836 determines whether the new pixel belongs to the pixel quad occupying the current line. If not, and if no more lines are available (step 1838) then the buffer is flushed; but if more lines are available, the line count is incremented (step 1842) and the pixel is stored in the next line of array 500 (step 1824).

If step 1836 determines that the new pixel does correspond to the current pixel quad, then a final check is made in step 1844 to determine whether storing the new pixel in array 500 according to its LSBs will violate the no-reordering rule. To accomplish this, a direction flag ("stored sequence direction indicator") is determined after the second pixel has been stored in any pixel quad entry. This indicator will be invalid until a direction can be detected. Thus, step 1839 checks whether it is valid. If it is, then step 1841 compares the sequence direction of the new pixel with the expected direction. If the direction is not as expected (if storing the new pixel would violate the no-reordering rule) then operation continues at step 1838, and the new pixel is simply stored on a new line if possible. But if the direction is as expected, the pixel is stored in the current line (step 1824).

Steps 1843 and 1845 are included to show how the stored sequence direction indicator is determined. If step 1843 is reached, and the new pixel would be the second pixel in a quad entry, then step 1845 sets the stored sequence indicator according to the sequence (incrementing column addresses or decrementing column addresses) established by the new pixel.

Modifications for Non-32-Bit Frame Buffers. If the invention is to be used in graphics systems having frame buffer memories designed with storage locations smaller than 32 bits wide, some modifications should be made to the above-described embodiments:

For single pixel mode using a 16-bit-wide frame buffer memory, the column decodes for array 500 should be as follows: {the LSB of the pixel column address, the MSB of the BEN bits for the pixel}. Also, array 506 should be made one bit wider than the one described above, so that it can store the next-to-least significant bit of the pixel column address in addition to the more significant bits of the column address. At flush time, the column address LSB for each pixel may be taken from the MSB of the column of array 500 in which the pixel is stored; the other column address bits for the pixel would come from array 506.

For single pixel mode using an 8-bit-wide frame buffer memory, the column decodes for array 500 should be as follows: {the two-bit encoded version of the pixel's 4 BEN bits}. Also, array 506 should be made two bits wider than the one described above, so that it can store all of the pixel's column address bits. At flush time, all column address bits for each pixel would come from array 506.

In multi-pixel mode, the above-described embodiment should function properly without modification, no matter how wide the storage locations in the frame buffer memory.

While the invention has been described in detail with reference to preferred embodiments thereof, the described embodiments have been presented by way of example and not by way of limitation. It will be understood by those skilled in the art that various changes may be made in the form and details of the described embodiments without deviating from the spirit and scope of the invention as defined by the appended claims.

What is Claimed is:

1. Circuitry for storing pixel commands to facilitate reordering of the pixel commands, each pixel command comprising pixel data and pixel row/bank and column addresses to facilitate reordering of the pixel commands, comprising:

a bus for receiving a pixel commands from a pipeline, each pixel command accompanied by pixel data, a pixel row/bank address and a pixel column address;

a row/bank address storage array for storing each received pixel command's row/bank address in a row/bank address entry when the received pixel command's row/bank address is not currently stored in the row/bank address storage array;

a multi-line column address storage array for storing in an available line of the column address storage array the MSBs of the pixel command's column addresses when such MSBs are not currently stored in a line of the column address storage array that is currently associated with the row/bank address entry matching the command's row/bank address;

a line-in-use bit array having columns associated with columns of the row/bank address storage array and rows associated with lines of the column address storage array, wherein cells of the line-in-use bit array associate the row/bank address entry matching the command's row/bank address with the line of the column address storage array in which the pixel's column address MSBs are stored when such an association has not been made for a previously-received command; and a multi-line pixel data storage array, having lines of pixel entry locations which are associated with the lines of the column address storage array, for storing the pixel command's pixel data within a line of pixel entries in the pixel data storage array which is associated with the line of the column address storage array in which the command's column address MSBs are stored.

2. A method for storing memory access commands each comprising pixel data and pixel row/bank and column addresses to facilitate reordering of the memory access commands, wherein for each received memory access command, the method comprises:

storing the received command's row/bank address in a row/bank address entry of a row/bank address storage array when the row/bank address is not currently stored in the row/bank address storage array;

storing the MSBs of the command's column addresses in an available line of a multi-line column address storage array when such MSBs are not currently stored in a line of the column address storage array that is currently associated with the row/bank address entry matching the command's row/bank address;

firstly associating the row/bank address entry matching the command's row/bank address with the line of the column address storage array in which the pixel's column address MSBs are stored when such first association has not been made for a previously-received command;

secondly associating a line of pixel entries in a multi-line pixel data storage array with the line of the column address storage array in which the command's column address MSBs are stored when such second association has not been made for a previously-received memory access command; and storing the command's pixel data within the associated line of the pixel entries.

3. The method of claim 2, further comprising:

selecting for batch flushing a group of pixel data entries which are associated with a same row/bank address.

4. The method of claim 3, further comprising:

flushing the selected group of currently-stored pixel data when the group meets at least one of the following conditions:

condition 1: [Did a previous flush operation leave the group partially unflushed?] AND [Is the group's age older than a threshold age? OR Is the group's size larger than a threshold size?];

condition 2: [Is the group's binary bank address unequal to the binary bank address of the last-flushed group?] AND [Is the group's binary bank address unequal to the bank address of the z buffer that is attached to the last-flushed group AND Does the group's size exceed a threshold size?];

condition 3: [Is the group's binary bank address unequal to the binary bank address of the last-flushed group?] AND [Is the group's binary bank address unequal to the binary bank address of the z buffer that is attached to the last-flushed group?] AND [Does the group's age exceed a threshold age?].

5. The method of claim 2, further comprising:

flushing at least a portion of the stored pixel data.

6. The method of claim 2, further comprising:

selecting a group of pixel data entries which are associated with a same row/bank address;

selecting a flushing mode from one of the following three flushing modes: (1) must flush all stored pixel data from storage, (2) must flush at least all stored pixel data in the selected group, or (3) may flush only a portion of all stored pixel data in the selected group; and flushing the stored pixel data according to the selected flushing mode.

7. The method of claim 6, wherein, when the selected flushing mode is mode (3), the method further comprises:

after each line of stored pixel entries belonging to the selected group is flushed and while more lines of pixel entries belonging to the selected group remain in storage, determining condition 1: [Is the group not older than a threshold age? AND Is the size of the group remaining to be flushed not larger than a threshold size?]; and if condition 1 is true, discontinuing the flush even though the group has only been partially flushed.

8. The method of claim 7, further comprising:

if condition 1 is false, determining condition 2: [Is room available in the output buffer for the smaller of a maximum batch size or the remainder of this group?]; and if condition 2 is true, continuing to flush the group.

9. The method of claim 2, further comprising:

flushing at least a portion of the stored pixel data when a timeout has occurred during which no new memory access commands have been received.

10. The method of claim 2, further comprising:

flushing at least a portion of the stored pixel data when a pixel collision occurs.

11. The method of claim 2, further comprising:

flushing at least a portion of the stored pixel data when the received command's row/bank address is not and cannot be stored in a row/bank address entry of a row/bank address storage array.

12. The method of claim 2, further comprising:

flushing at least a portion of the stored pixel data when the MSBs of a received memory access command's column addresses is not and cannot be stored in the column address storage array.

13. The method of claim 2, further comprising:

flushing at least a portion of the stored pixel data when a timeout has occurred during which an output buffer has been idle.

14. The method of claim 2, further comprising:

selecting for batch flushing an optimal group of pixel data entries which are associated with a same row/bank address based on at least one best-group criterion; and flushing the selected group of pixel data entries.

15. The method of claim 14, wherein the at least one best-group criterion comprises:

[Was the last-flushed group only partially flushed?] AND [Is the last-flushed group older than a threshold age? OR Is the last-flushed group larger than a threshold size?].

16. The method of claim 14, wherein the at least one best-group criterion comprises:

[If there are no currently-stored "bank mesh" groups whose binary bank addresses are neither equal to the binary bank address of the last-flushed group nor equal to the binary bank address of the z buffer that is attached to the last-flushed group, then select the largest of the currently-stored groups].

17. The method of claim 14, wherein the at least one best-group criterion comprises: [If there are any currently-stored "large bank mesh" groups whose binary bank addresses are neither equal to the binary bank address of the last-flushed group nor equal to the binary bank address of the z buffer that is attached to the last-flushed group, AND at least one of the bank mesh groups is larger than a threshold size, then select the largest of the large bank mesh groups].

18. The method of claim 14, wherein the at least one best-group criterion comprises: [If there are any currently-stored "old bank mesh" groups whose binary bank addresses are neither equal to the binary bank address of the last-flushed group nor equal to the binary bank address of the z buffer that is attached to the last-flushed group, AND at least one of the bank mesh groups is older than a threshold age, then select-the largest of the old bank mesh groups].

19. The method of claim 14, wherein the at least one best-group criterion comprises: [If there are any currently-stored "bank mesh" groups whose binary bank addresses are neither equal to the binary bank address of the last-flushed group nor equal to the binary bank address of the z buffer that is attached to the last-flushed group, BUT none of the bank mesh groups is larger than a threshold size or older than a threshold age, then select the largest of the bank mesh groups].

20. The method of claim 14, further comprising:

flushing pixel data that share a common row/bank address by sending at least first pixel data and last pixel data to an output buffer;

accompanying the first pixel with a flag indicating that it is the first pixel data in the batch; and accompanying the last pixel data with a flag indicating that it is the last pixel data in the batch.

21. The method of claim 2, wherein the memory access commands are pixel commands.

* * * * *